(12) United States Patent
Osada et al.

(10) Patent No.: US 10,315,592 B2
(45) Date of Patent: Jun. 11, 2019

(54) WIRE HARNESS

(71) Applicant: Yazaki Corporation, Tokyo (JP)

(72) Inventors: Yasumasa Osada, Shizuoka (JP); You Yanagida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/024,647

(22) Filed: Jun. 29, 2018

(65) Prior Publication Data

US 2018/0326926 A1 Nov. 15, 2018

Related U.S. Application Data

(63) Continuation of application No. PCT/JP2017/013648, filed on Mar. 31, 2017.

(30) Foreign Application Priority Data

Apr. 1, 2016 (JP) ................................. 2016-074313
Mar. 29, 2017 (JP) ................................. 2017-064481

(51) Int. Cl.
*H01B 9/00* (2006.01)
*B60R 16/02* (2006.01)
(Continued)

(52) U.S. Cl.
CPC ........ *B60R 16/0207* (2013.01); *B60R 16/023* (2013.01); *B60R 16/0215* (2013.01);
(Continued)

(58) Field of Classification Search
None
See application file for complete search history.

(56) References Cited

U.S. PATENT DOCUMENTS 3,476,871 A * 11/1969 Erdle .................... H02G 5/005
                                                    174/117 FF
4,702,294 A * 10/1987 Kubica ................ B60C 9/0007
                                                    152/556
(Continued)

FOREIGN PATENT DOCUMENTS

JP      2000-164042 A      6/2000
JP      2015-097432 A      5/2015
(Continued)

OTHER PUBLICATIONS

International Search Report and Written Opinion of the International Search Report for PCT/JP2017/013648 dated May 9, 2017.

*Primary Examiner* — Dimary S Lopez Cruz
*Assistant Examiner* — Muhammed Azam
(74) *Attorney, Agent, or Firm* — Kenealy Vaidya LLP

(57) ABSTRACT

A wire harness includes a power trunk line, a power branch line, a communication trunk line, and a communication branch line. The power trunk line is connected to a power source mounted on a vehicle and extend in a longitudinal direction of the vehicle. The power branch line branches off from the power trunk lines and extends in a direction intersecting with the longitudinal direction. The communication trunk line is arranged along the power trunk lines or also serves as the power trunk lines. The communication branch line branches off from the communication trunk line and extends in a direction intersecting with the longitudinal direction.

20 Claims, 28 Drawing Sheets

(51) Int. Cl.
*B60R 16/023* (2006.01)
*B60R 16/033* (2006.01)
*H01B 13/012* (2006.01)

(52) U.S. Cl.
CPC ........... *B60R 16/033* (2013.01); *H01B 9/003* (2013.01); *H01B 13/01254* (2013.01)

(56) References Cited

U.S. PATENT DOCUMENTS

| | | | | |
|---|---|---|---|---|
| 4,824,164 | A * | 4/1989 | Nakayama | B60R 16/0207 174/72 A |
| 5,057,026 | A * | 10/1991 | Sawai | H02B 1/207 439/43 |
| 5,645,455 | A * | 7/1997 | Seki | H01R 13/405 439/189 |
| 5,785,542 | A * | 7/1998 | Johnson | H01R 25/162 439/210 |
| 5,785,786 | A * | 7/1998 | Suzuki | B62D 27/02 156/204 |
| 5,821,464 | A * | 10/1998 | Graham | H02G 5/007 174/86 |
| 6,203,343 | B1 * | 3/2001 | Chevassus-More | B60R 16/0207 174/72 B |
| 6,220,874 | B1 * | 4/2001 | Kurata | B60R 16/0207 439/76.2 |
| 6,504,262 | B1 * | 1/2003 | Aoki | B60R 16/0207 307/10.1 |
| 6,575,760 | B2 * | 6/2003 | Doshita | B60R 16/027 174/72 A |
| 6,994,562 | B2 * | 2/2006 | Suzuki | H01R 13/6658 326/30 |
| 7,561,445 | B2 * | 7/2009 | Yajima | B60K 6/445 174/72 A |
| 7,572,149 | B2 * | 8/2009 | Matsuura | H01R 12/616 439/620.21 |
| 7,587,795 | B2 * | 9/2009 | Yamamoto | B60R 16/0215 174/117 F |
| 7,624,503 | B2 * | 12/2009 | Fukuda | H01B 7/0045 174/72 A |
| 8,461,726 | B2 * | 6/2013 | Maki | H02G 3/086 307/147 |
| 8,586,872 | B2 * | 11/2013 | Sugiura | H05K 1/05 174/252 |
| 8,900,002 | B2 * | 12/2014 | Mooney | H01R 4/60 439/212 |
| 8,937,250 | B2 * | 1/2015 | Terada | B60N 2/0715 174/72 A |
| 9,312,645 | B2 * | 4/2016 | Orris | H01R 24/20 |
| 9,485,892 | B2 * | 11/2016 | Nakata | H01B 7/08 |
| 2003/0085618 | A1 * | 5/2003 | Rhodes | B60R 16/0207 307/10.1 |
| 2004/0061446 | A1 * | 4/2004 | Rhodes | B60R 16/0207 315/77 |
| 2006/0159987 | A1 * | 7/2006 | Kikuchi | B23K 11/11 429/121 |
| 2011/0053398 | A1 * | 3/2011 | Arai | H01B 7/285 439/271 |
| 2013/0328393 | A1 * | 12/2013 | Bullock | B60K 6/46 307/10.1 |
| 2015/0263496 | A1 * | 9/2015 | Sugino | H02G 3/0437 174/95 |
| 2015/0360627 | A1 * | 12/2015 | Sasaki | B60R 16/0207 174/72 A |
| 2016/0325699 | A1 * | 11/2016 | Yoshida | B60K 6/22 |
| 2018/0326926 | A1 * | 11/2018 | Osada | B60R 16/0215 |

FOREIGN PATENT DOCUMENTS

| | | |
|---|---|---|
| JP | 2015-156331 A | 8/2015 |
| JP | 2015-176654 A | 10/2015 |
| JP | 2016-004686 A | 1/2016 |

* cited by examiner

WIRE HARNESS

CROSS-REFERENCE TO RELATED APPLICATION(S)

This application is a continuation of PCT International Application No. PCT/JP2017/013648, filed on Mar. 31, 2017 which claims the benefit of priority from Japanese Patent Application No. 2016-074313 filed on Apr. 1, 2016 and Japanese Patent Application No. 2017-064481 filed on Mar. 29, 2017, the entire contents of which are incorporated herein by reference.

BACKGROUND OF THE INVENTION

1. Field of the Invention

The present invention relates to a wire harness.

2. Description of the Related Art

Conventionally widely known are wire harnesses arranged in vehicles. Wire harnesses connect devices mounted on a vehicle and are used to supply electric power and perform communications. Various techniques for wire harnesses have been developed, including a wire harness disclosed in Japanese Patent Application Laid-open No. 2015-97432, for example, capable of being easily formed into a shape along a wiring path.

With recent demand for multifunctional and high-functional vehicles, the wiring path of wire harnesses that connect devices mounted on a vehicle may possibly be complicated, or the number of wiring processes may possibly increase.

SUMMARY OF THE INVENTION

The present invention aims to provide a wire harness that can be arranged in a simpler wiring path.

A wire harness according to one aspect of the present invention includes a power trunk line connected to a power source mounted on a vehicle and extending in a longitudinal direction of the vehicle; a power branch line branching off from the power trunk line and extending in a direction intersecting with the longitudinal direction; a communication trunk line arranged along the power trunk line or also serving as the power trunk line; and a communication branch line branching off from the communication trunk line and extending in a direction intersecting with the longitudinal direction, wherein the power trunk line and the communication trunk line are flat wiring materials and layered with each other, and the communication trunk line is arranged outermost in a layering direction.

According to another aspect of the present invention, in the wire harness, it is preferable that the communication branch line is arranged along the power branch line.

According to still another aspect of the present invention, in the wire harness, it is preferable that the power trunk line connects the power source arranged in a rear part of the vehicle and a power generator arranged in a front part of the vehicle.

According to still another aspect of the present invention, in the wire harness, it is preferable that the trunk line includes a plurality of power trunk lines belonging to a plurality of respective systems.

According to still another aspect of the present invention, it is preferable that the wire harness further includes a ground line extending along the power trunk line.

According to still another aspect of the present invention, it is preferable that the wire harness further includes a communication controller arranged between the communication trunk line and the communication branch line to control communications, wherein a power line of the communication controller is connected to the power trunk line or the power branch line.

According to still another aspect of the present invention, in the wire harness, it is preferable that the power trunk line and the communication trunk line are arranged in the longitudinal direction along a floor panel of the vehicle, and the power branch line and the communication branch line branch off from the power trunk line and the communication trunk line, respectively, in a vehicle width direction and are arranged in the vehicle width direction along the floor panel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a wire harness according to the present invention are described below in greater detail with reference to the accompanying drawings. The embodiments are not intended to limit the invention. Components according to the embodiments below include components easily conceivable by those skilled in the art or components substantially identical therewith.

First Embodiment

Figure 1:
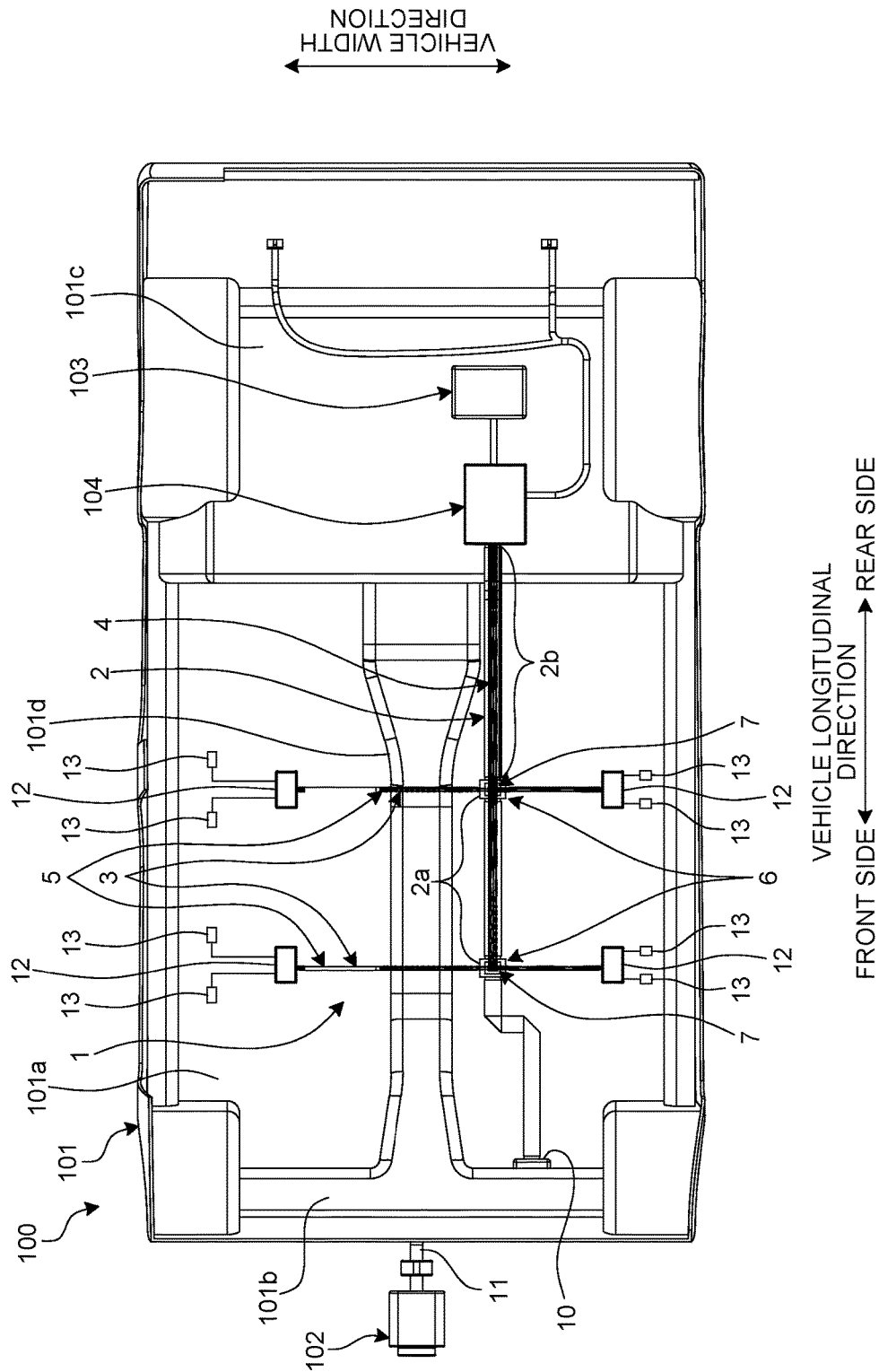
FIG. 1 is a plan view of a vehicle according to a first embodiment of the present invention.
Figure 2:
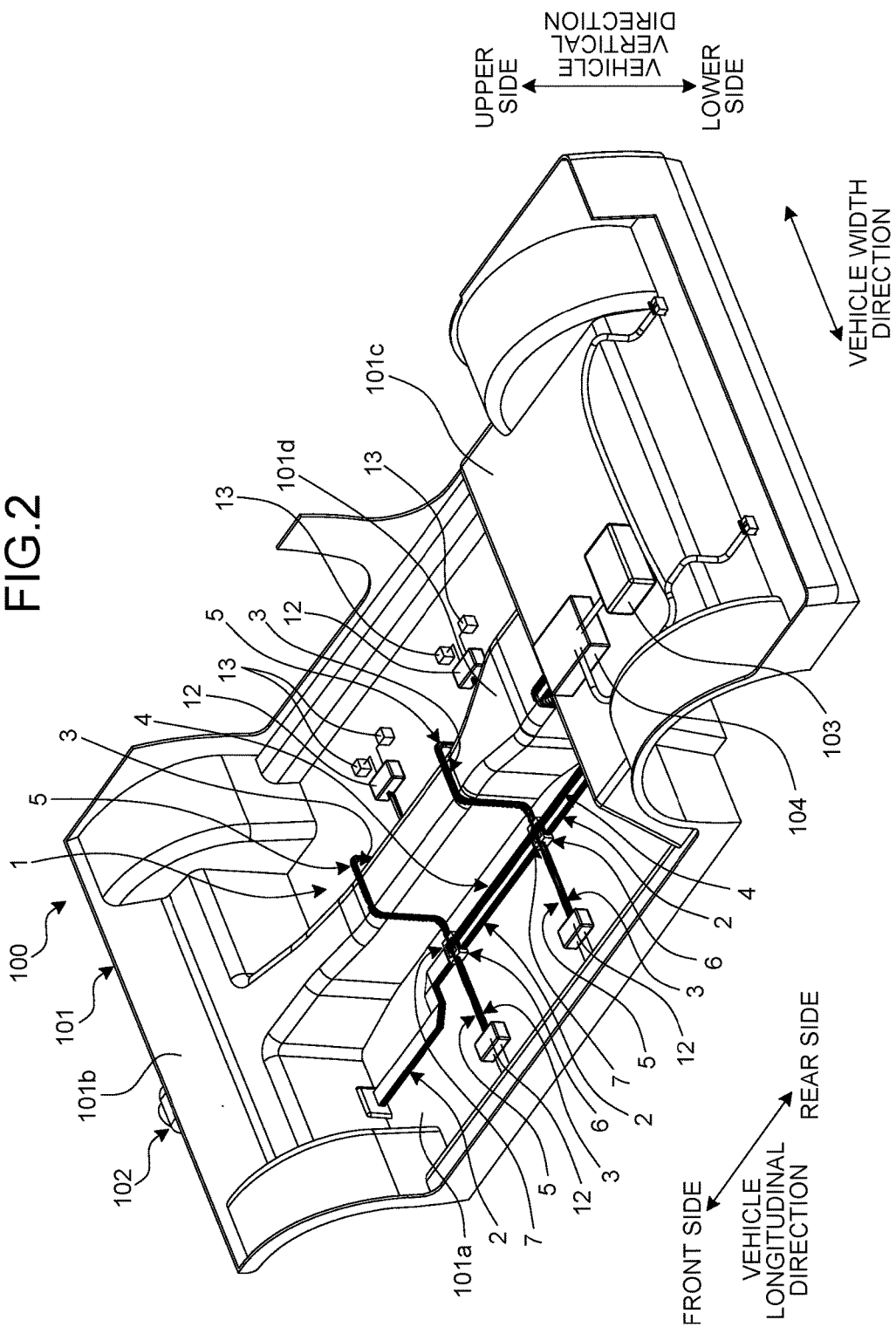
FIG. 2 is a perspective view of the vehicle according to the first embodiment.
Figure 3:
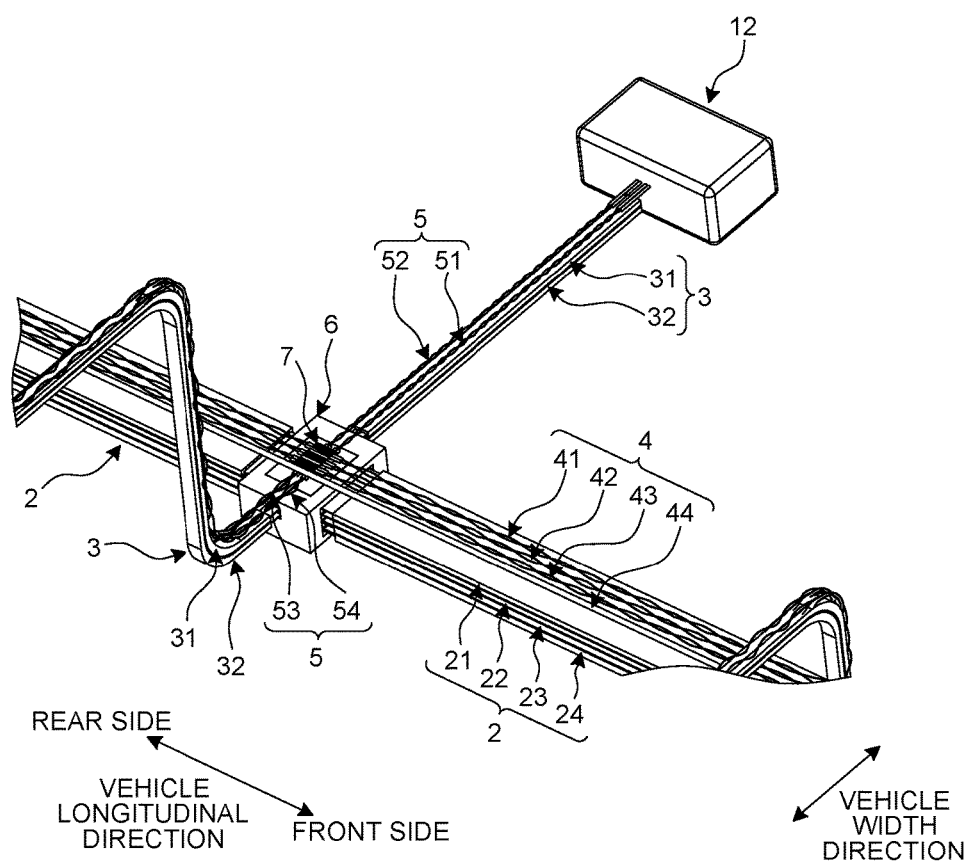
FIG. 3 is a perspective view of a main part of a wire harness according to the first embodiment.
Figure 4:
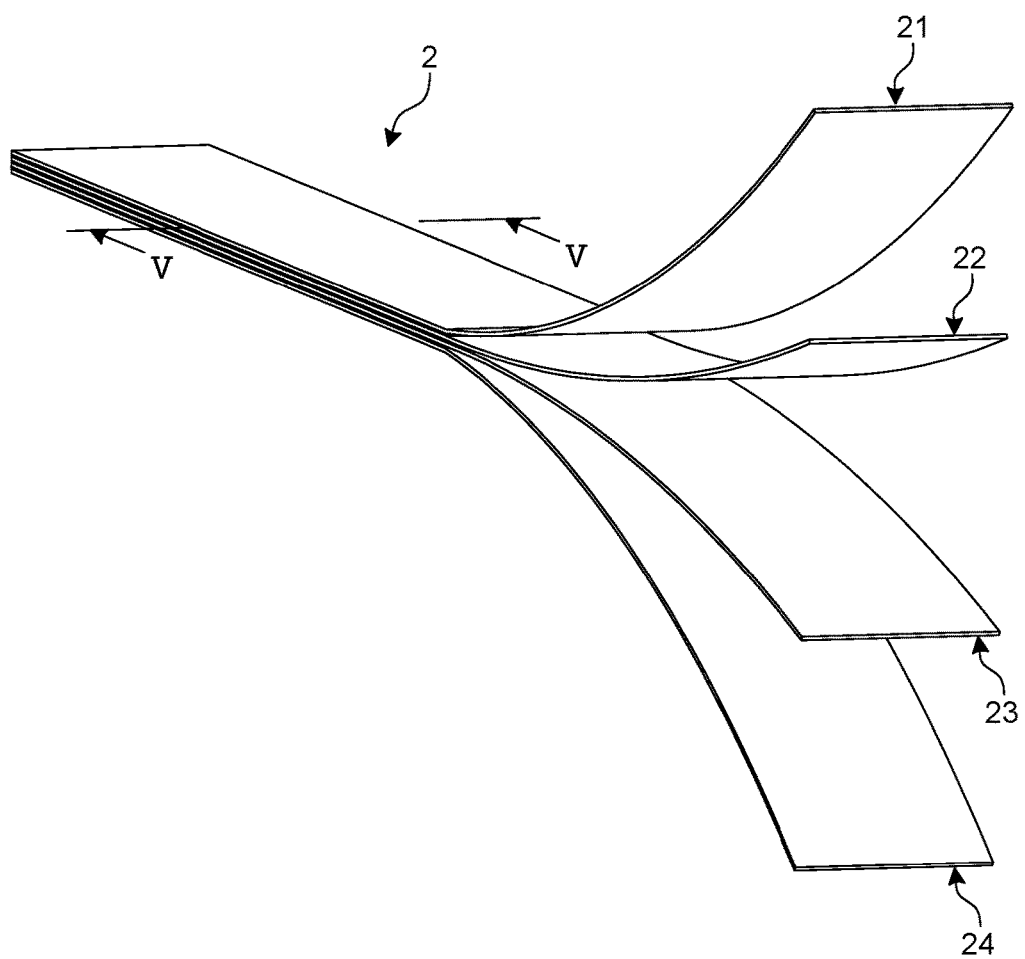
FIG. 4 is a perspective view of components of a power trunk line unit according to the first embodiment.
Figure 5:
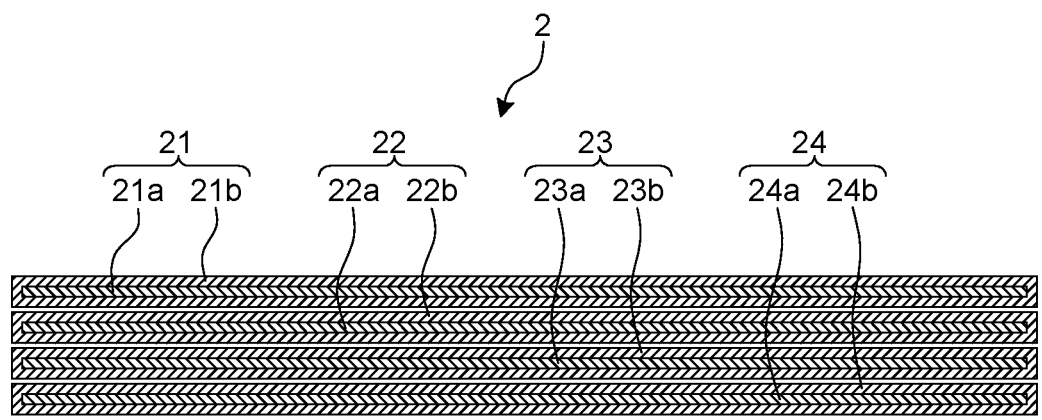
FIG. 5 is a sectional view of the power trunk line unit according to the first embodiment.
Figure 6:
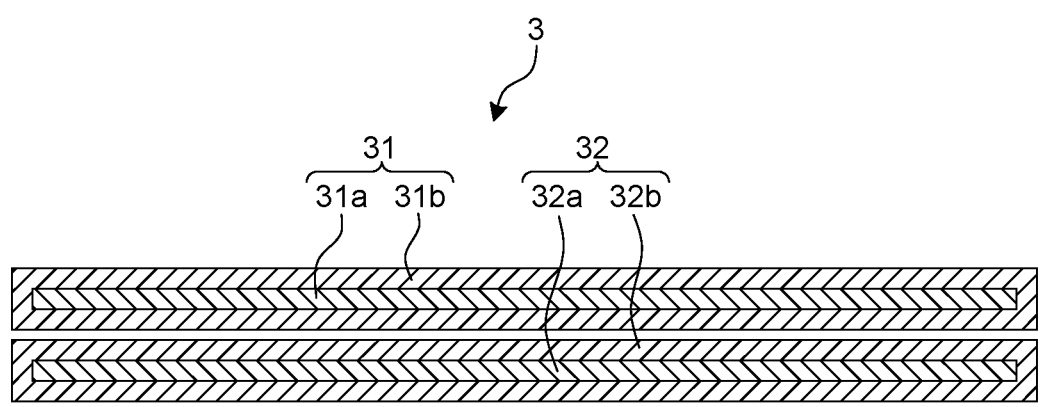
FIG. 6 is a sectional view of a power branch line unit according to the first embodiment.
Figure 7:
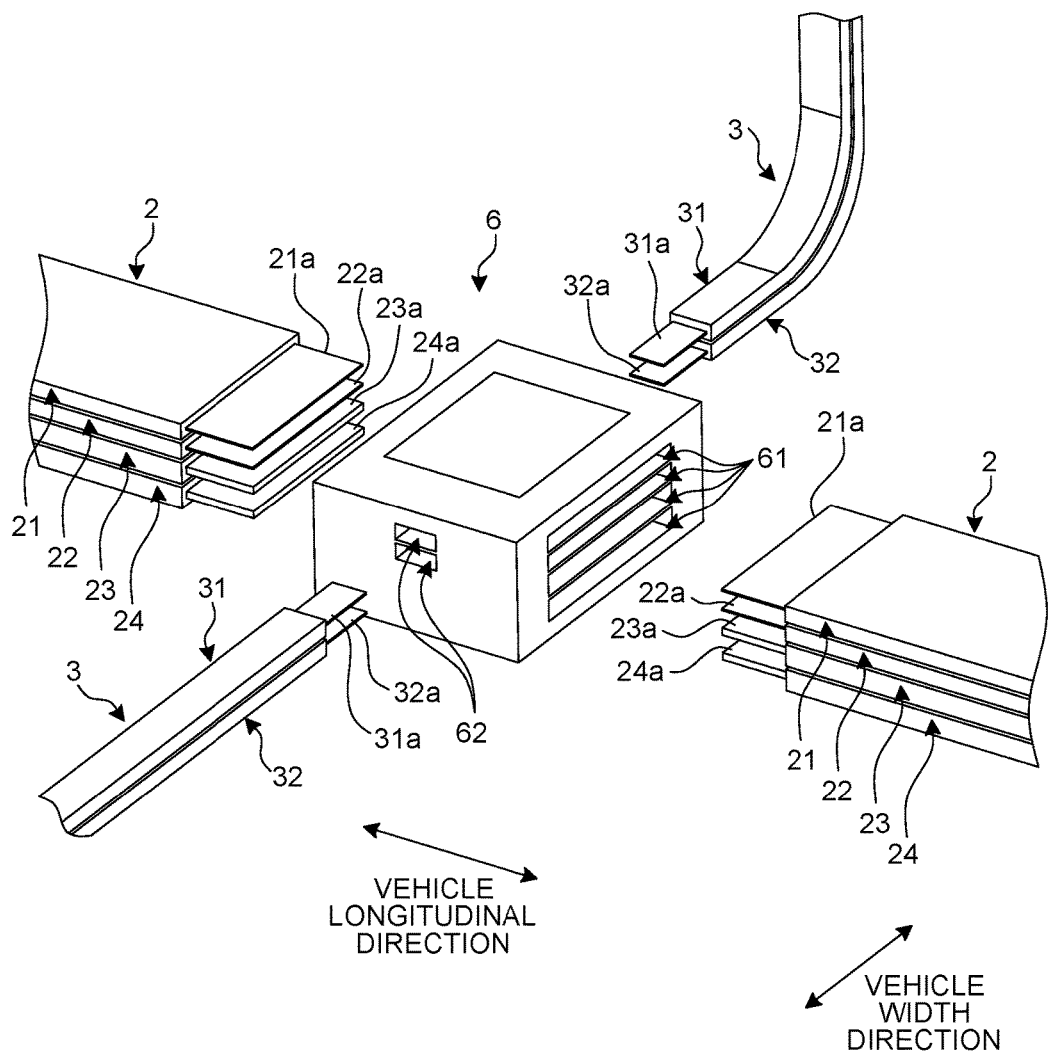
FIG. 7 is a view for explaining connection of a terminal block, power trunk lines, and power branch lines.

A first embodiment according to the present invention is described with reference to FIGS. 1 to 7. The present embodiment relates to a wire harness. FIG. 1 is a plan view of a vehicle according to the first embodiment. FIG. 2 is a perspective view of the vehicle according to the first embodiment. FIG. 3 is a perspective view of a main part of the wire harness according to the first embodiment. FIG. 4 is a perspective view of components of a power trunk line unit according to the first embodiment. FIG. 5 is a sectional view of the power trunk line unit according to the first embodiment. FIG. 6 is a sectional view of a power branch line unit according to the first embodiment. FIG. 7 is a view for explaining connection of a terminal block, power trunk lines, and power branch lines. FIG. 5 is a sectional view along line V-V in FIG. 4.

A wire harness 1 according to the present embodiment is used in vehicles, such as cars including hybrid cars and electric cars. As illustrated in FIGS. 1 and 2, the wire harness 1 according to the present embodiment includes a power trunk line unit 2, power branch line units 3, a communication trunk line 4, communication branch lines 5, power terminal blocks 6, communication terminal blocks 7, and distributors 12. The wire harness 1 according to the present embodiment is arranged on a floor panel 101 of a vehicle 100.

The floor panel 101 is a member corresponding to a part under the floor of the vehicle. The floor panel 101 is supported by wheels of the vehicle 100 via a suspension. The floor panel 101 has a main body 101a, a front-side protrusion 101b, a rear-side protrusion 101c, and a tunnel 101d. The main body 101a is a plate-like component. The front-side protrusion 101b is connected to the front end of the main body 101a and protrudes upward. The front-side protrusion 101b covers the axle of the front wheels of the vehicle 100 from above. The rear-side protrusion 101c is connected to the rear end of the main body 101a and protrudes upward. The rear-side protrusion 101c covers the axle of the rear wheels of the vehicle 100 from above. The tunnel 101d protrudes upward with respect to the main body 101a and extends in a vehicle longitudinal direction. The tunnel 101d is formed at the center in a vehicle width direction on the floor panel 101. The tunnel 101d is a hollow tunnel-like portion having a substantially rectangular sectional shape. The front end of the tunnel 101d is connected to the front-side protrusion 101b, and the rear end thereof is connected to the rear-side protrusion 101c. The inner space of the tunnel 101d accommodates an exhaust pipe, for example.

The vehicle 100 according to the present embodiment includes a motor generator 102 (hereinafter, referred to as an "MG 102"). The MG 102 is one of electrical devices mounted on the vehicle 100 and arranged in a front part of the vehicle 100. More specifically, the MG 102 is arranged in front of the front-side protrusion 101b. The MG 102 according to the present embodiment has a function as a motor that converts supplied electric power into mechanical force and a function as a power generator that converts mechanical force into electric power. The MG 102 may be used as an alternator that generates electricity from force transmitted from the wheels and the engine, for example. The MG 102 may also be used as a starter motor that consumes electric power supplied from a battery 103, which will be described later, to start the engine. The MG 102 may also be used as a source of traveling power of the vehicle 100.

The battery 103 is a power source of the vehicle 100. The battery 103 is a power storage device that can be charged and discharged. The voltage of the battery 103 according to the present embodiment is 48 V. The battery 103 is arranged in a rear part of the vehicle 100. More specifically, the battery 103 is arranged on the upper surface of the rear-side protrusion 101c. The vehicle 100 according to the present embodiment has the MG 102 and the battery 103 separately arranged on the front side and the rear side, respectively, of the vehicle. This configuration optimizes the weight balance in the longitudinal direction, for example. The battery 103 is electrically connected to the MG 102 and other electrical devices 13 arranged at respective parts of the vehicle 100 by the wire harness 1. Examples of the electrical devices 13 include, but are not limited to, devices of a traveling system such as steering, devices of a safety system such as an air bag, devices of a body system such as a door lock, devices of a multimedia system such as an audio system, etc. The battery 103 supplies electric power to the MG 102 and the electrical devices 13 via the wire harness 1 or is charged with electric power transmitted from the MG 102 and the electrical devices 13 via the wire harness 1.

A power source controller 104 is arranged in front of the battery 103 on the rear-side protrusion 101c. The power source controller 104 is a control device that control charge and discharge of the battery 103. The power source controller 104 is connected to the battery 103 via a power line and a communication line. The power source controller 104 has a function of monitoring the power source, a function of cutting off an electric current, and a function of backing up the power source, for example.

The wire harness 1 according to the present embodiment is connected to the battery 103 via the power source controller 104. The power source controller 104 controls discharge from the battery 103 to the wire harness 1 and charge from the wire harness 1 to the battery 103. The power source controller 104 includes a voltage converting unit. The voltage converting unit is a DC-DC converter, for example, and decreases the voltage of a direct current received from the battery 103 to output a direct current having a low voltage. The power source controller 104 has a high-voltage power terminal and a low-voltage power terminal as power output terminals. The high-voltage power terminal outputs the direct current received from the battery 103 without decreasing the voltage. The low-voltage power terminal outputs the direct current having a low voltage the voltage of which is decreased by the voltage converting unit.

The power trunk line unit 2 of the wire harness 1 extends in the vehicle longitudinal direction along the upper surface of the floor panel 101. The rear end of the power trunk line unit 2 is connected to the power source controller 104. The front end of the power trunk line unit 2 is connected to a connector 10 arranged on the floor panel 101. The connector 10 is arranged on a vertical wall of the front-side protrusion 101b. A power line that connects the connector 10 and the MG 102 is arranged in a pipe 11. In other words, the end of the power trunk line unit 2 on the side opposite to the battery 103 side is connected to the MG 102 via the connector 10 and the power line in the pipe 11. As described above, the power trunk line unit 2 is a trunk power line unit serving as a backbone that connects the MG 102 arranged in the front part of the vehicle 100 and the battery 103 arranged in the rear part thereof and extends in the vehicle longitudinal direction.

The power trunk line unit 2 according to the present embodiment is arranged in the vehicle longitudinal direction along the tunnel 101d. More specifically, the power trunk line unit 2 is arranged on the side of and near the tunnel 101d. In the wire harness 1 according to the present embodiment, a plurality of power trunk line units 2 are connected via the terminal blocks 6.

The power branch line unit 3 branches off from the power trunk line unit 2 and extends in a direction intersecting with the vehicle longitudinal direction. In the wire harness 1 according to the present embodiment, the power branch line unit 3 branches off in a direction orthogonal to the power trunk line unit 2. The power branch line unit 3 is connected to the electrical devices 13. In other words, the power branch line unit 3 is a power branching line that electrically connects the power trunk line unit 2 to the electrical devices 13. The power branch line unit 3 extends in a direction intersecting with the vehicle longitudinal direction, typically, in the vehicle width direction and the vehicle vertical direction.

The power branch line unit 3 is connected to the power trunk line unit 2 by the terminal block 6. The end of the power branch line unit 3 on the side opposite to the terminal block 6 side is connected to the distributor 12. The distributor 12 is an electrical connection box, for example. The distributor 12 may include a control device, such as an electronic control unit (ECU), and have a function of a communication gateway. The distributor 12 has a function of distributing electric power supplied from the power branch line unit 3 to the electrical devices 13 and a function of distributing communications from the communication branch line 5 to the electrical devices 13. The distributor 12 includes a power terminal, a communication terminal, an output terminal, components, and a housing. The power terminal is connected to the power branch line unit 3. The communication terminal is connected to the communication branch line 5. The output terminal is connected to the electrical device 13. The components include a communication unit, a controller, a relay, and a fuse, for example. The housing accommodates the components described above. The output terminal of the distributor 12 includes a terminal that supplies electric power to the electrical device 13 and a terminal connected to the electrical device 13 in a communicable manner.

The wire harness 1 according to the present embodiment includes a plurality of power branch line units 3. In other words, a plurality of power branch line units 3 branch off from the power trunk line unit 2 in the vehicle width direction. The power branch line units 3 are connected to the respective distributors 12. The distributors 12 are provided to respective areas or for respective functions, for example. The internal space of the vehicle 100 is divided into a plurality of areas, and corresponding distributors 12 are provided to the respective areas, for example. The internal space of the vehicle 100 according to the present embodiment is divided into a plurality of areas in the vehicle longitudinal direction. The internal space is further divided into a right area and a left area in the vehicle width direction with respect to the power trunk line unit 2.

The communication trunk line 4 according to the present embodiment is arranged in the vehicle longitudinal direction along the power trunk line unit 2. More specifically, the communication trunk line 4 is arranged along the upper surface of the power trunk line unit 2. As illustrated in FIG. 1, for example, the communication trunk line 4 is arranged along an intermediate range 2a and a vehicle rear-side range 2b in the vehicle longitudinal direction in the power trunk line unit 2. The wire harness 1 according to the present embodiment includes two terminal blocks 6 arranged at different positions in the vehicle longitudinal direction. The terminal blocks 6 distribute the power from the power trunk line unit 2 to the respective power branch line units 3. The intermediate range 2a is a range between the two terminal blocks 6. The vehicle rear-side range 2b is a range between the power source controller 104 and the terminal block 6 positioned on the rear side.

The communication branch line 5 branches off from the communication trunk line 4 and extends in a direction intersecting with the vehicle longitudinal direction. In the wire harness 1 according to the present embodiment, the communication branch line 5 branches off in a direction orthogonal to the communication trunk line 4. The communication branch line 5 is connected to a communication device. In other words, the communication branch line 5 is a communication branching line that connects the communication trunk line 4 to the communication device in a manner capable of performing wired communications. The communication branch line 5 is connected to a communication port (communication terminal) of the distributor 12. The distributor 12 includes a communication unit that performs communications via the communication port. In other words, the distributor 12 has a function as a communication device that performs communications with the other distributors 12, the electrical devices 13, and the power source controller 104. The distributor 12 controls supply of electric power to the electrical devices 13 based on command signals received from the power source controller 104, for example. The distributor 12 distributes communications from the communication branch line 5 to the electrical devices 13. While examples of the communication protocol employed in the communication trunk line 4 and the communication branch line 5 include controller area network (CAN), CAN with flexible data rate (CAN-FD), Ethernet (registered trademark), etc., it is not limited thereto.

The following describes the configuration of the power trunk line units 2 and the power branch line units 3 according to the present embodiment with reference to FIGS. 3 to 6. As illustrated in FIGS. 3 and 4, the power trunk line unit 2 according to the present embodiment includes a first power trunk line 21, a second power trunk line 23, a first ground line 22, and a second ground line 24. The power trunk line unit 2 serves as the backbone of the wire harness 1 together with the communication trunk line 4. The first power trunk line 21, the second power trunk line 23, the first ground line 22, and the second ground line 24 are flat wiring materials. The flat wiring material is a wiring material including a conductor extending in the axial direction and having a flat section orthogonal to the axial direction. Examples of the flat wiring material include, but are not limited to, a bus bar, an extruded wiring material, etc.

As illustrated in FIG. 5, the power trunk lines 21 and 23 according to the present embodiment are extruded wiring materials including element wires 21a and 23a and covers 21b and 23b, respectively. The element wires 21a and 23a have a rectangular sectional shape. The covers 21b and 23b are film-like insulating materials that cover the element wires 21a and 23a, respectively. The ground lines 22 and 24 are extruded wiring materials including element wires 22a and 24a and covers 22b and 24b, respectively. The element wires 22a and 24a have a rectangular sectional shape. The covers 22b and 24b are film-like insulating materials that cover the element wires 22a and 24a, respectively. The power trunk lines 21 and 23 and the ground lines 22 and 24 are layered in the thickness direction. In the power trunk line unit 2 according to the present embodiment, the first power trunk line 21, the first ground line 22, the second power trunk line 23, the second ground line 24 are layered in this order. The widths of the power trunk lines 21 and 23 and the ground lines 22 and 24 according to the present embodiment are the same. This structure cancels effects of mutual inductance, thereby removing noise.

The first power trunk line 21 and the first ground line 22 serve as a power line unit of a low-voltage system. The second power trunk line 23 and the second ground line 24 serve as a power line unit of a high-voltage system. The voltage of the low-voltage system according to the present embodiment is 12 V, and the voltage of the high-voltage system is 48 V. The ground line (first ground line 22) is sandwiched between the first power trunk line 21 and the second power trunk line 23. This structure reduces the possibility that the element wire 21a of the first power trunk line 21 and the element wire 23a of the second power trunk line 23 directly come into contact with each other. The first power trunk line 21 is connected to the power terminal of the low-voltage system in the power source controller 104. The second power trunk line 23 is connected to the power terminal of the high-voltage system in the power source controller 104. The first ground line 22 and the second ground line 24 are connected to ground terminals in the power source controller 104. In the wire harness 1 according to the present embodiment, the thickness of the power trunk line unit 2 (cross section of the element wires 21a, 22a, 23a, and 24a) is the same from the front side of the vehicle to the rear side thereof. In other words, the power trunk line unit 2 having the consistent capacitance is arranged from the power source controller 104 to the connector 10.

As illustrated in FIG. 3, the power branch line unit 3 includes a first power branch line 31 and a first ground branch line 32. The first power branch line 31 and the first ground branch line 32 are flat wiring materials. As illustrated in FIG. 6, the first power branch line 31 and the first ground branch line 32 according to the present embodiment include element wires 31a and 32a and covers 31b and 32b, respectively. The element wires 31a and 32a have a rectangular sectional shape. The covers 31b and 32b are film-like insulating materials that cover the element wires 31a and 32a, respectively. The first power branch line 31 and the first ground branch line 32 are layered in the thickness direction. The first power branch line 31 and the first ground branch line 32 serve as a power line unit of the low-voltage system. The first power branch line 31 is electrically connected to the first power trunk line 21 in the terminal block 6. The first ground branch line 32 is electrically connected to the first ground line 22 in the terminal block 6.

As illustrated in FIG. 7, the terminal block 6 according to the present embodiment has a rectangular parallelepiped shape. The terminal block 6 electrically connects two power trunk line units 2 and electrically connects the power trunk line units 2 and the power branch line units 3. The terminal block 6 has insertion holes 61 for the power trunk line units 2 on a pair of side surfaces opposite to each other in the vehicle longitudinal direction. The insertion holes 61 have trunk line terminals connected to the respective lines of the power trunk line units 2. The element wires 21a, 22a, 23a, and 24a of the power trunk line units 2 are electrically connected and fixed to the respective trunk line terminals. The terminal block 6 has a lock structure that fixes the power trunk line units 2. The terminal block 6 has insertion holes 62 for the power branch line units 3 on a pair of side surfaces opposite to each other in the vehicle width direction. The insertion holes 62 have branch line terminals connected to the respective lines of the power branch line units 3. The element wires 31a and 32a of the power branch line units 3 are electrically connected and fixed to the respective branch line terminals. The terminal block 6 has a lock structure that fixes the power branch line units 3.

Terminals corresponding to each other are electrically connected in the terminal block 6. Specifically, the trunk line terminals for the first power trunk lines 21 are electrically connected to each other and also electrically connected to the branch line terminals for the first power branch lines 31. The trunk line terminals for the first ground lines 22 are electrically connected to each other and are also electrically connected to the branch line terminals for the first ground branch lines 32. The trunk line terminals for the second power trunk lines 23 are electrically connected to each other. The trunk line terminals for the second ground lines 24 are electrically connected to each other. The terminal block 6 includes fuses corresponding to the respective power branch line units 3.

As illustrated in FIG. 3, the communication trunk line 4 includes a first communication trunk line 41, a second communication trunk line 42, a third communication trunk line 43, and a fourth communication trunk line 44. The first communication trunk line 41, the second communication trunk line 42, and the third communication trunk line 43 are twisted electric wires. The twisted electric wires are obtained by twisting two covered electric wires. One of the two covered electric wires is used as a signal line, and the other thereof is used as a ground line. The communication trunk lines 41 to 43 are used for respective systems or respective areas, for example. The communication trunk lines 41 to 43 may be used for respective systems, such as a traveling system, a safety system, a body system, and an automatic driving system. The fourth communication trunk line 44 is an optical fiber cable. The fourth communication trunk line 44 is used for high-speed communications in a multimedia system, for example. The first communication trunk line 41, the second communication trunk line 42, the third communication trunk line 43, and the fourth communication trunk line 44 are arranged parallel to each other in this order. The end of the communication trunk line 4 on the rear side of the vehicle is connected to the power source controller 104. The communication trunk line 4 extends from the power source controller 104 toward the front side of the vehicle along the power trunk line unit 2.

The wire harness 1 according to the present embodiment includes two terminal blocks 7. One communication terminal block 7 is provided for one power terminal block 6. The communication terminal block 7 is arranged on the upper surface of the power terminal block 6. The terminal block 7 electrically connects the communication trunk line 4 and the communication branch line 5. The first communication trunk line 41, the second communication trunk line 42, and the third communication trunk line 43 are held by the terminal block 7. The terminal block 7 according to the present embodiment is a pressure contact terminal. The pressure contact terminal can minimize a change in characteristic impedance and effects of noise in a branching unit. The terminal block 7 includes holders that hold covered electric wires of the respective communication trunk lines 41 to 43. The holders each have a pressure contact blade. The pressure contact blade penetrates the cover of the covered electric wire and is electrically connected to the element wire in the covered electric wire. The length of the communication trunk lines 41 to 43 loosened in the branching unit is preferably made as short as possible. The terminal block 7 may further include a holder that holds the fourth communication trunk line 44.

The communication branch line 5 includes first communication branch lines 51 and 53 and second communication branch lines 52 and 54. The first communication branch lines 51 and 53 and the second communication branch lines 52 and 54 are twisted electric wires. The first communication branch line 51 and the second communication branch line 52 extend from the terminal block 7 toward one side in the vehicle width direction. The first communication branch line 53 and the second communication branch line 54 extend from the terminal block 7 toward the other side in the vehicle width direction. The communication branch lines 51 to 54 are held by the terminal block 7. The terminal block 7 includes holders that hold covered electric wires of the respective communication branch lines 51 to 54. The holders each have a pressure contact blade that comes into contact with the element wire of the covered electric wire.

The terminal block 7 electrically connects the signal lines of the first communication trunk line 41 and the first communication branch line 51 and electrically connects the ground lines thereof. The terminal block 7 electrically connects the signal lines of the second communication trunk line 42 and the second communication branch line 52 and electrically connects the ground lines thereof. The terminal block 7 electrically connects the signal lines of the second communication trunk line 42 and the second communication branch line 54 and electrically connects the ground lines thereof. The terminal block 7 electrically connects the signal lines of the third communication trunk line 43 and the first communication branch line 53 and electrically connects the ground lines thereof. In the branching unit between the communication trunk line 4 and the communication branch line 5, branching by ultrasonic joining may be performed instead of branching by a pressure contact terminal.

The communication branch lines 51 to 54 are arranged along the power branch line unit 3. In the wire harness 1 according to the present embodiment, the first communication branch lines 51 and 53 are arranged parallel to the second communication branch lines 52 and 54 along the upper surface of the power branch line unit 3. The ends of the communication branch lines 51 to 54 on the side opposite to the terminal block 7 side are connected to the respective distributors 12. The distributors 12 connect the communication branch lines 51 to 54 to the electrical devices 13.

As described above, the wire harness 1 according to the present embodiment includes the power trunk lines 21 and 23, the first power branch line 31, the communication trunk line 4, and the communication branch line 5. The power trunk lines 21 and 23 are connected to the battery 103 mounted on the vehicle 100 and extend in the longitudinal direction of the vehicle 100. The first power branch line 31 branches off from the first power trunk line 21 and extends in a direction intersecting with the longitudinal direction. The communication trunk line 4 is arranged along the power trunk lines 21 and 23. The communication branch line 5 branches off from the communication trunk line 4 and extends in a direction intersecting with the longitudinal direction. The wire harness 1 is composed of the power trunk lines 21 and 23 and the communication trunk line 4 extending in the longitudinal direction and of the first power branch line 31 and the communication branch line 5 extending in the direction intersecting with the longitudinal direction. With this configuration, the wire harness 1 can be arranged in a simpler wiring path. Compared with a case where a power line and a communication line are arranged in different paths, for example, the present embodiment can simplify the wiring path and the wiring process. Compared with a case where a power line gradually branches off from one electrical connection box and is connected to devices at distal ends via a plurality of electrical connection boxes, the present embodiment can simplify the wiring path and the wiring process. In other words, the wire harness 1 according to the present embodiment has advantageous effects in shortening the length of lines and reducing the number of lines. Consequently, the present embodiment can improve fuel economy by weight reduction in the wire harness 1 and mountability of the wire harness 1 to a vehicle.

The wire harness 1 according to the present embodiment facilitates standardization of the power trunk line unit 2 and the communication trunk line 4. In a case where devices mounted on the vehicle 100 differ depending on the model and the grade of the vehicle 100, the power branch line unit 3 and the communication branch line 5 or the distributor 12 can be changed. In other words, the wire harness 1 according to the present embodiment has high extensibility and is favorable for standardization.

The wire harness 1 according to the present embodiment includes the power trunk lines 21 and 23 of a plurality of systems. The first power trunk line 21 according to the present embodiment belongs to the low-voltage system, and the second power trunk line 23 belongs to the high-voltage system. The systems do not necessarily have different voltages. The wire harness 1, for example, may include power trunk lines of a plurality of systems having the same voltage. Examples of the systems may include, but are not limited to, the traveling system, the safety system, the body system, the multimedia system, etc.

The wire harness 1 according to the present embodiment includes the ground lines 22 and 24 extending along the power trunk lines 21 and 23. The power trunk lines 21 and 23 and the ground lines 22 and 24 are integrated to serve as the power trunk line unit 2, thereby simplifying the wiring path. The power trunk lines 21 and 23 and the ground lines 22 and 24 are made of flat wiring materials, thereby reducing the height of the power trunk line unit 2.

In the wire harness 1 according to the present embodiment, the power trunk lines 21 and 23 and the communication trunk line 4 are arranged in the longitudinal direction along the floor panel 101 of the vehicle 100. The first power branch line 31 and the communication branch line 5 branch off from the power trunk lines 21 and 23 and the communication trunk line 4, respectively, in the vehicle width direction and are arranged in the vehicle width direction along the floor panel 101. By combining the trunk lines arranged in the vehicle longitudinal direction and the branch lines branching off from the trunk lines and extending in the vehicle width direction, the present embodiment can simplify the wiring path to the devices mounted on the vehicle 100.

The distributors 12 may be arranged at the branching units between the power trunk line unit 2 and the communication trunk line 4 and the power branch line unit 3 and the communication branch line 5, respectively, instead of being connected to the distal ends of the power branch line unit 3 and the communication branch line 5. In other words, the distributors 12 may be arranged instead of the terminal blocks 6 and 7. In this case, one distributor 12 can distribute power and communications to the electrical devices 13 arranged on both sides in the vehicle width direction.

While the power trunk line unit 2, the power branch line unit 3, the communication trunk line 4, and the communication branch line 5 in the wire harness 1 according to the present embodiment each include the ground line, the present invention is not limited thereto. The ground line of any one of the trunk lines 2 and 4 and the branch lines 3 and 5 may be arranged separately from the wire harness 1.

To remove noise in communications, for example, a magnetic tape may be wound around the flat wiring materials, or a noise filter may be provided to the flat wiring materials.

The shapes of the power trunk line unit 2, the power branch line unit 3, the communication trunk line 4, and the communication branch line 5 are not limited to those described above. The lines of the power trunk line unit 2 and the lines of the power branch line unit 3 may be a wiring material different from the flat wiring material, that is, a round electric wire, for example.

While the communication trunk line 4 according to the present embodiment is arranged along the ranges 2a and 2b (refer to FIG. 1) from the power source controller 104 to the terminal block 6 on the front side in the power trunk line unit 2, the wiring range of the communication trunk line 4 is not limited thereto. The communication trunk line 4, for example, may be arranged in a range from one end to the other end of the power trunk line unit 2, that is, along the entire power trunk line unit 2. The communication trunk line 4 may be arranged from the power source controller 104 to the connector 10, for example.

The ground line may be shared by different voltage systems. The ground line of the low-voltage system (first ground line 22) and the ground line of the high-voltage system (second ground line 24), for example, may be one ground line.

First Modification of the First Embodiment

Figure 8:
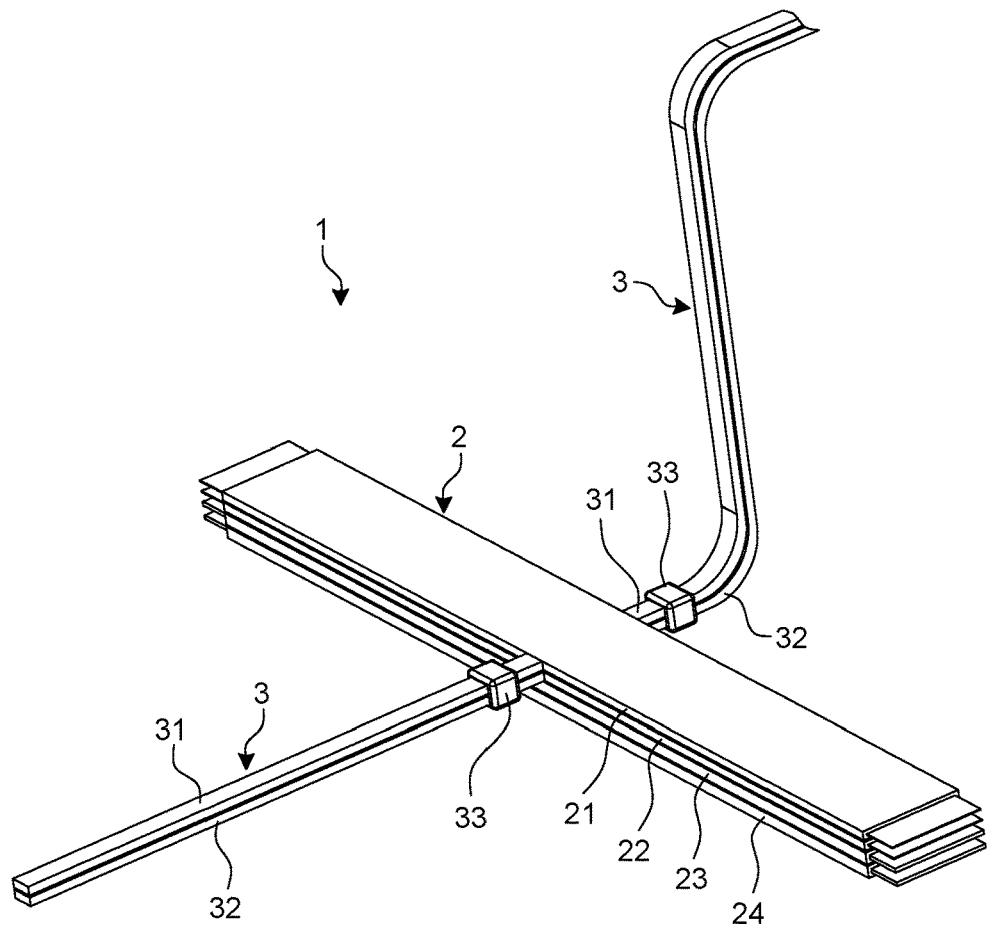
FIG. 8 is a view for explaining a form of connection between the power trunk line and the power branch lines according to a first modification of the first embodiment.

The following describes a first modification of the first embodiment. FIG. 8 is a view for explaining a form of connection between the power trunk line and the power branch lines according to the first modification of the first embodiment. The lines of the power trunk line unit 2 and the lines of the power branch line unit 3 may be connected by inter-metal joining. In the wire harness 1 illustrated in FIG. 8, the element wire of the first power trunk line 21 and the element wires of the first power branch lines 31 are electrically connected by inter-metal joining. The element wire of the first ground line 22 and the element wires of the first ground branch lines 32 are electrically connected by inter-metal joining. Inter-metal joining is a method of joining by cold pressure welding, ultrasonic welding, and laser welding, for example. In a case where the power trunk line unit 2 and the power branch line units 3 are connected by inter-metal joining, the power branch line units 3 are preferably provided with respective fuses 33 as illustrated in FIG. 8.

Second Modification of the First Embodiment

Figure 9:
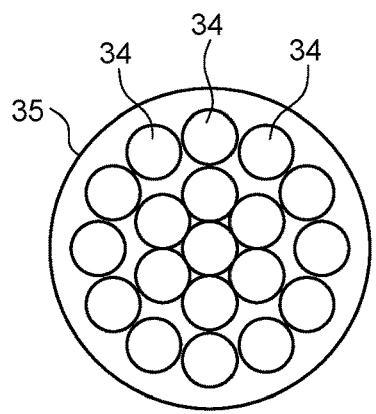
FIG. 9 is a sectional view of the power branch line according to a second modification of the first embodiment.

The following describes a second modification of the first embodiment. FIG. 9 is a sectional view of the power branch line according to the second modification of the first embodiment. The power branch line unit 3 may be a round electric wire illustrated in FIG. 9. The round electric wire includes an element wire portion serving as an aggregate of a plurality of element wires 34 and an insulating cover 35 that covers the element wire portion.

Third Modification of the First Embodiment

Figure 10:
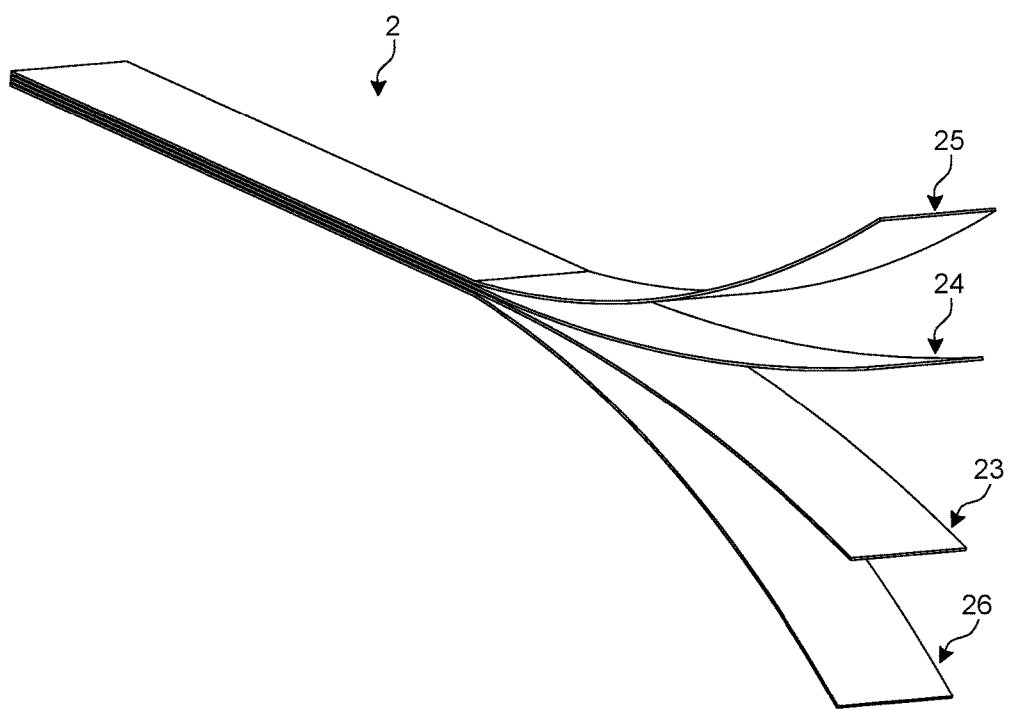
FIG. 10 is a view of the power trunk line unit according to a third modification of the first embodiment.

The following describes a third modification of the first embodiment. FIG. 10 is a view of the power trunk line unit according to the third modification of the first embodiment. The power trunk line unit 2 according to the third modification of the first embodiment also serves as the communication trunk line 4. The power trunk line unit 2 includes a power line communications (PLC) power trunk line 25, the second ground line 24, the second power trunk line 23, and a PLC ground line 26. The PLC power trunk line 25 and the PLC ground line 26 serve as a power line unit of the low-voltage system for PLC. The PLC power trunk line 25 serves as a power line of the low-voltage system and as a signal line for PLC that transmits signals. The PLC ground line 26 serves as a ground line of the low-voltage system and as a ground line for PLC. The PLC power trunk line 25 and the PLC ground line 26 serve as components of the power trunk line unit 2 and as components of the communication trunk line 4. As described above, the communication trunk line 4 according to the present modification also serves as the PLC power trunk line 25.

The PLC power trunk line 25 and the PLC ground line 26 are flat wiring materials. The PLC power trunk line 25, the second ground line 24, the second power trunk line 23, and the PLC ground line 26 are layered in this order in the thickness direction. The widths of the PLC power trunk line 25, the second ground line 24, the second power trunk line 23, and the PLC ground line 26 are the same. This structure cancels effects of mutual inductance, thereby stabilizing PLC. The PLC power trunk line 25 and the PLC ground line 26 serving as a communication line are arranged outermost in the layering direction of the layered body. This structure facilitates arrangement of a ferrite core for noise removal.

The used frequency band and the modulation system of PLC are not particularly restricted.

The PLC power trunk line 25 and the PLC ground line 26 may be a communication line different from the communication trunk line 4 according to the first embodiment or a communication line that substitutes for the communication trunk line 4 according to the first embodiment. Communications relating to control on the power may be performed by the PLC power trunk line 25 and the PLC ground line 26, and communications relating to processing other than control on the power may be performed by the communication trunk line 4 according to the first embodiment, for example.

Fourth Modification of the First Embodiment

Figure 11:
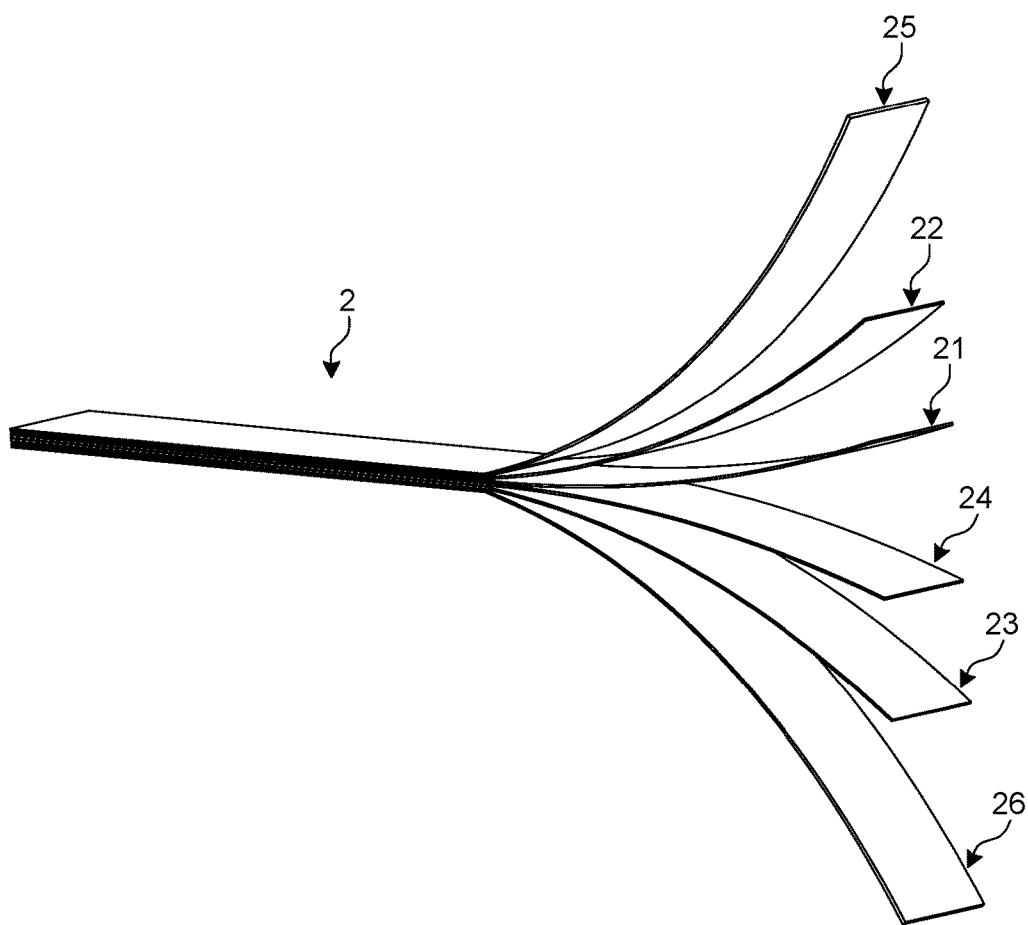
FIG. 11 is a view of the power trunk line unit according to a fourth modification of the first embodiment.

The following describes a fourth modification of the first embodiment. FIG. 11 is a view of the power trunk line unit according to the fourth modification of the first embodiment. The power trunk line unit 2 according to the fourth modification includes the PLC power trunk line 25 and the PLC ground line 26 besides the components of the power trunk line unit 2 according to the first embodiment. In the power trunk line unit 2 according to the present modification, the PLC power trunk line 25, the first ground line 22, the first power trunk line 21, the second ground line 24, the second power trunk line 23, and the PLC ground line 26 are layered in this order in the thickness direction.

The PLC power trunk line 25 and the PLC ground line 26 may be a communication line different from the communication trunk line 4 according to the first embodiment or a communication line that substitutes for the communication trunk line 4 according to the first embodiment.

Fifth Modification of the First Embodiment

Figure 12:
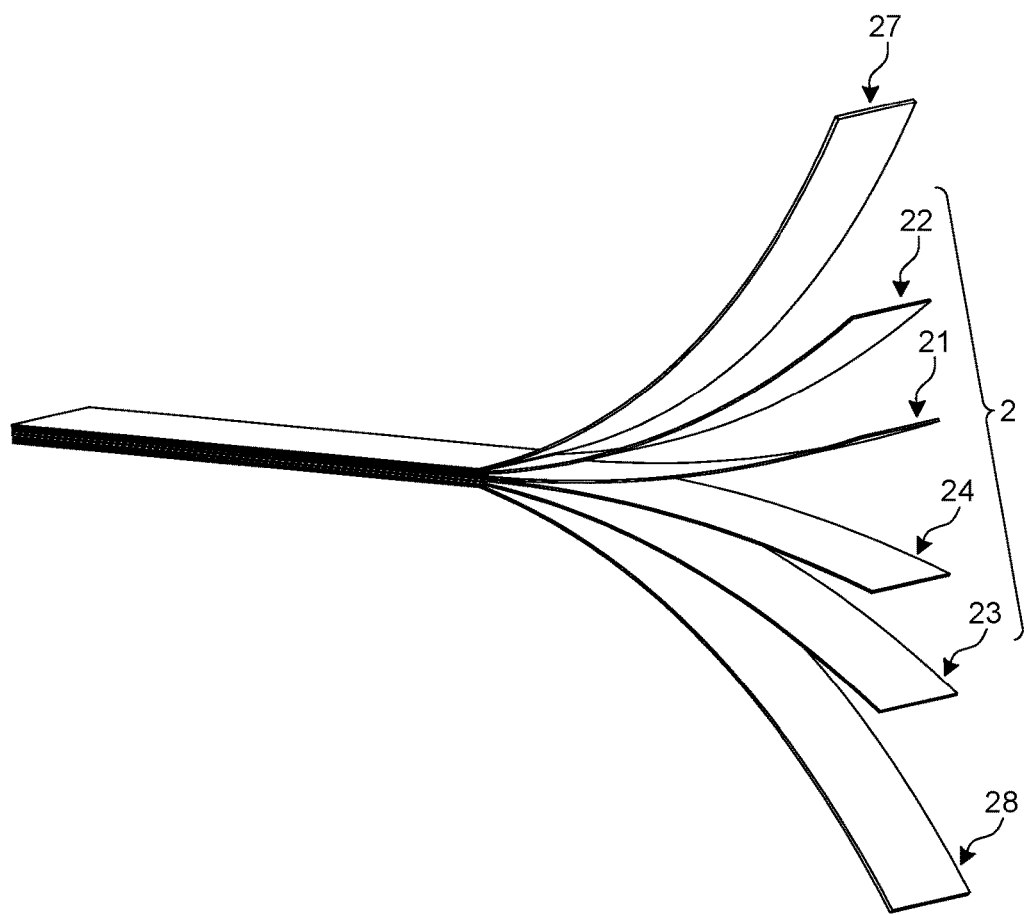
FIG. 12 is a view of the power trunk line unit and a communication line according to a fifth modification of the first embodiment.

The following describes a fifth modification of the first embodiment. FIG. 12 is a view of the power trunk line unit and a communication line according to the fifth modification of the first embodiment. The power trunk line unit 2 according to the fifth modification are sandwiched by a flat signal line 27 and a flat ground line 28. The flat signal line 27 and the flat ground line 28 are flat wiring materials. The flat signal line 27, the first ground line 22, the first power trunk line 21, the second ground line 24, the second power trunk line 23, and the flat ground line 28 are layered in this order in the thickness direction. The flat signal line 27 and the flat ground line 28 are components of the communication trunk line 4. The power trunk lines 21 and 23, the ground lines 22 and 24, the flat signal line 27, and the flat ground line 28 according to the present modification are flat wiring materials and layered with each other. This structure is favorable for reduction in the height of the wire harness 1.

The flat signal line 27 and the flat ground line 28 may be a communication line different from the communication trunk line 4 according to the first embodiment or a communication line that substitutes for the communication trunk line 4 according to the first embodiment.

Sixth Modification of the First Embodiment

Figure 13:
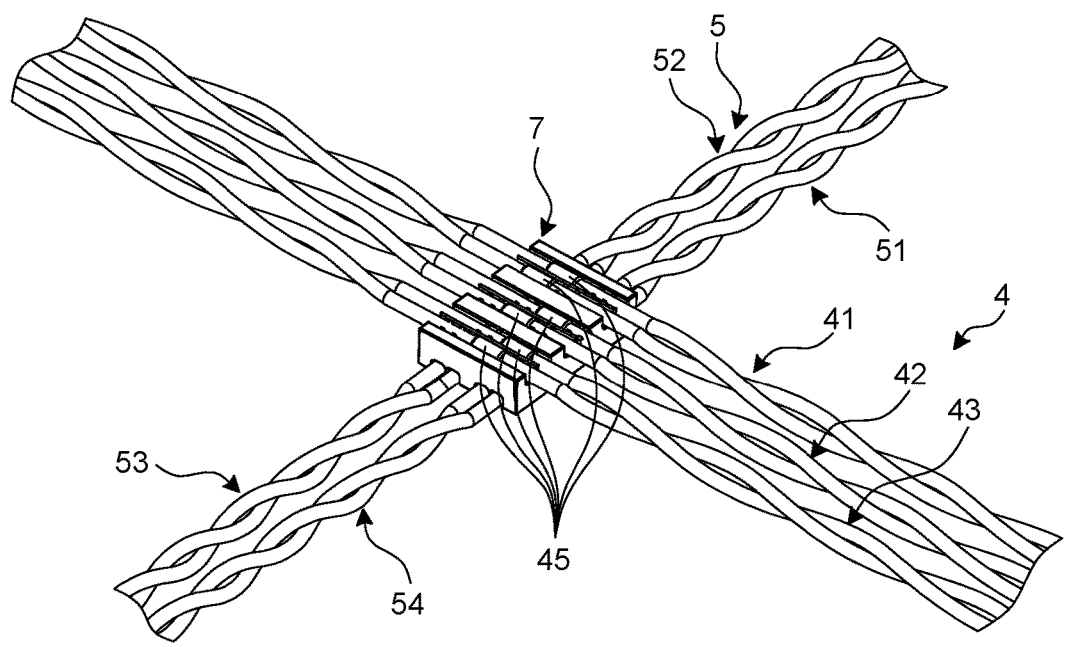
FIG. 13 is a perspective view of communication lines according to a sixth modification of the first embodiment.

The following describes a sixth modification of the first embodiment. FIG. 13 is a perspective view of communication lines according to the sixth modification of the first embodiment. The communication trunk line 4 according to the sixth modification includes ferrite cores 45. The ferrite cores 45 are provided to the respective covered electric wires constituting the communication trunk line 4. The ferrite cores 45 are electrically connected to the element wires of the respective coated electric wires. The ferrite cores 45 are electrically connected to the element wires of the communication branch lines 51 to 54 corresponding thereto via the terminal block 7. In other words, the element wires of the communication trunk line 4 are electrically connected to the element wires of the communication branch lines 51 to 54 via the respective ferrite cores 45. The ferrite cores 45 can suppress waveform distortion and absorb noise. Resistors may be used instead of the ferrite cores 45. In other words, the element wires of the communication trunk line 4 and the element wires of the communication branch line 5 may be electrically connected via the resistors.

Second Embodiment

Figure 14:
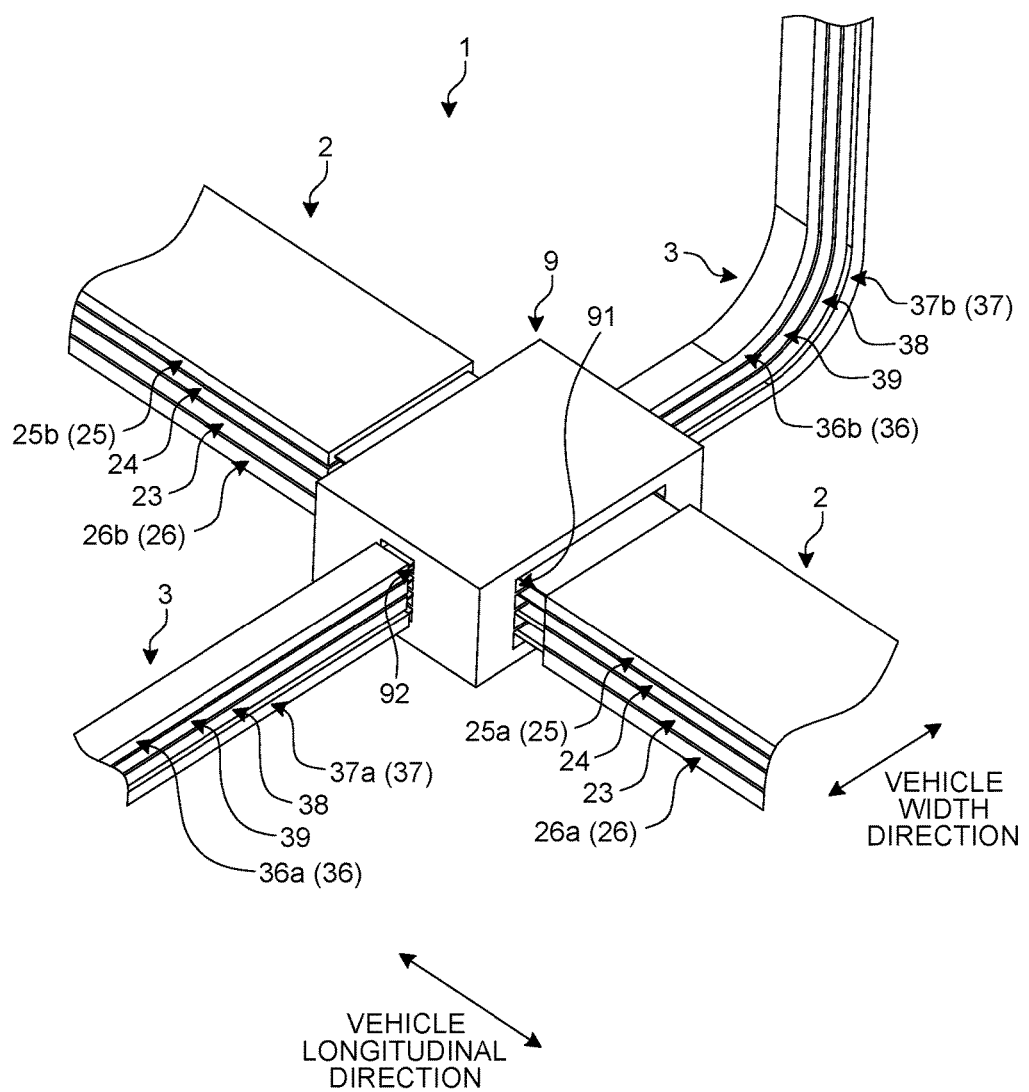
FIG. 14 is a perspective view of an appearance of an active branching unit according to a second embodiment of the present invention.
Figure 15:
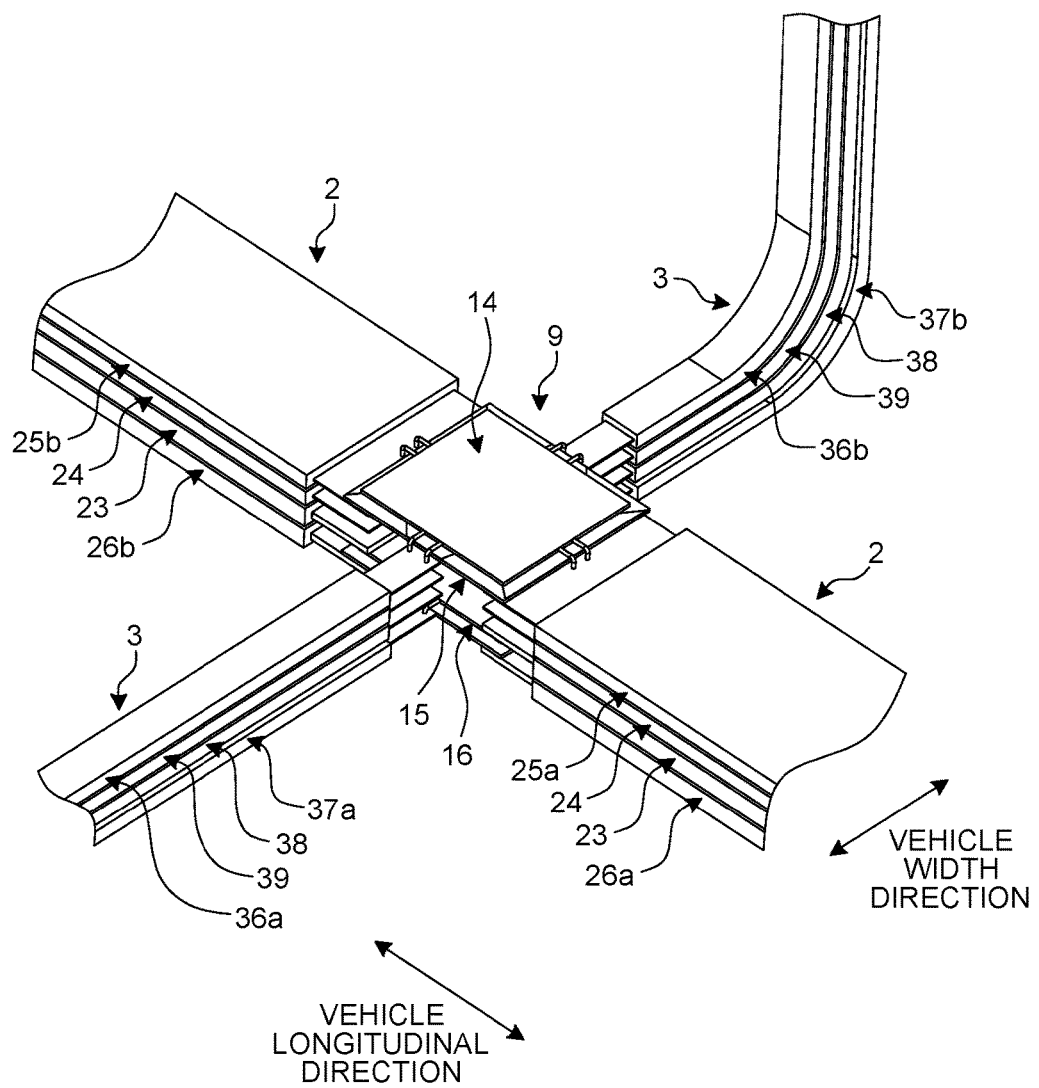
FIG. 15 is a perspective view of a PLC signal branching circuit of the active branching unit according to the second embodiment.
Figure 16:
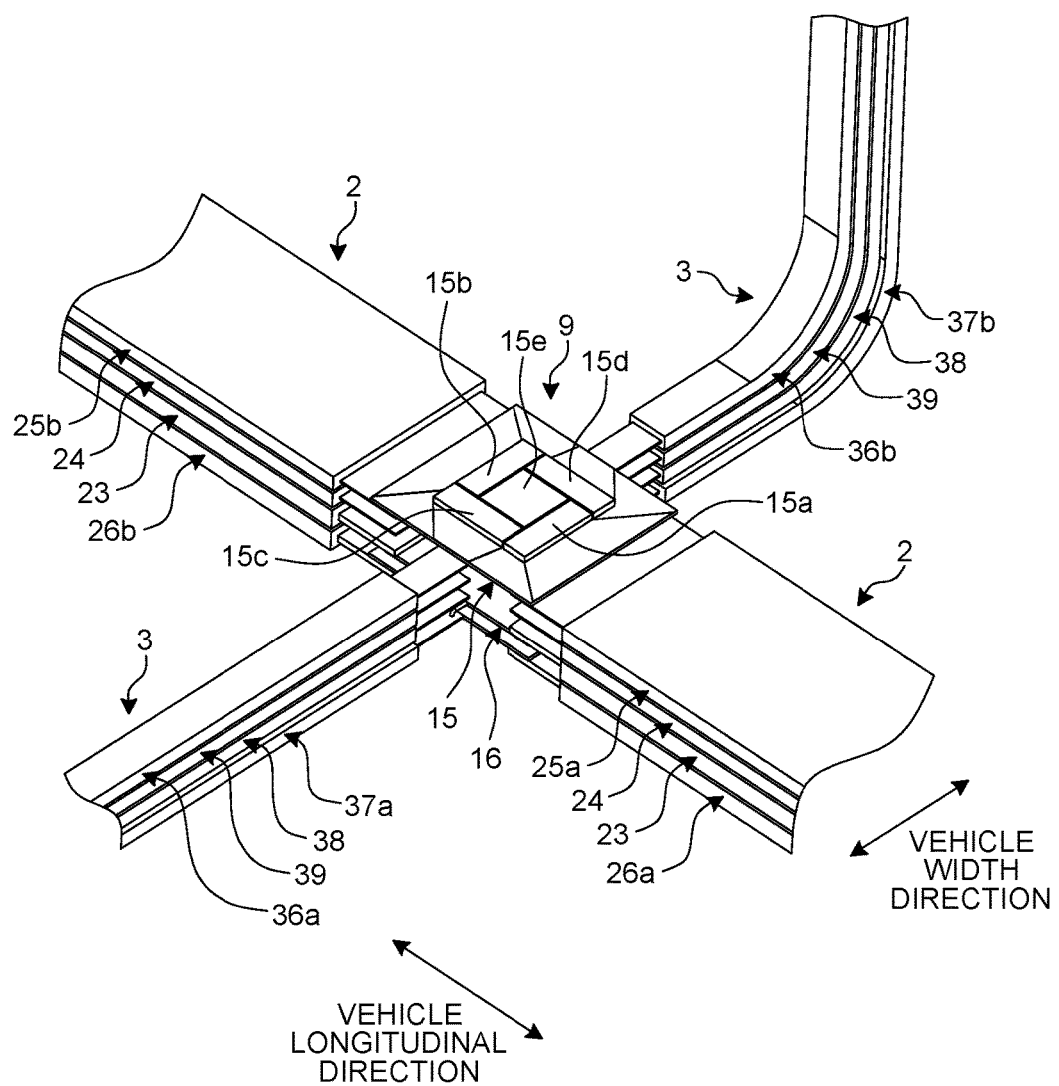
FIG. 16 is a perspective view of a power branching circuit of the active branching unit according to the second embodiment.
Figure 17:
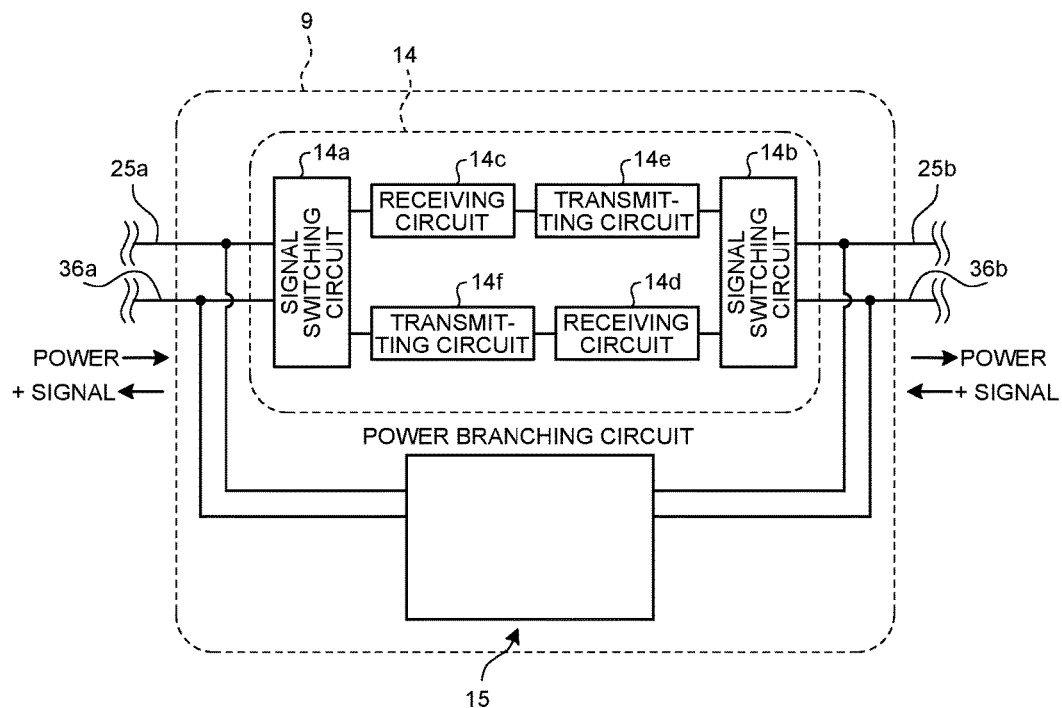
FIG. 17 is a block diagram of the active branching unit according to the second embodiment.
Figure 18:
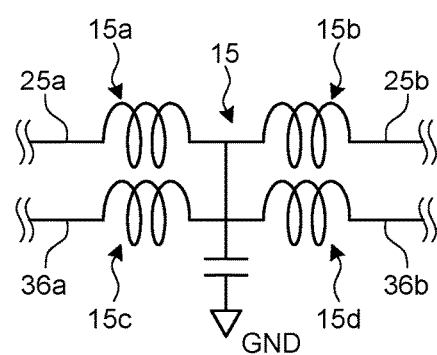
FIG. 18 is a circuit diagram of the power branching circuit according to the second embodiment.

A second embodiment according to the present invention is described with reference to FIGS. 14 to 18. Components of the second embodiment having the same functions as those described in the first embodiment are denoted by like reference numerals, and overlapping explanation thereof is omitted. FIG. 14 is a perspective view of an appearance of an active branching unit according to the second embodiment. FIG. 15 is a perspective view of a PLC signal branching circuit of the active branching unit according to the second embodiment. FIG. 16 is a perspective view of a power branching circuit of the active branching unit according to the second embodiment. FIG. 17 is a block diagram of the active branching unit according to the second embodiment. FIG. 18 is a circuit diagram of the power branching circuit according to the second embodiment.

An active branching unit 9 is a communication controller arranged between the communication trunk line 4 and the communication branch line 5 to control communications. The active branching unit 9 has a function of shaping and amplifying the waveform, for example, and serves as a repeater or a hub. The shaping of the waveform includes removal of ringing and correction of the bit width of signals, for example. The active branching unit 9 according to the present embodiment is a device having a rectangular parallelepiped shape. The active branching unit 9 has insertion holes 91 for the power trunk line units 2 on a pair of side surfaces opposite to each other in the vehicle longitudinal direction. The active branching unit 9 has insertion holes 92 for the power branch line units 3 on a pair of side surfaces opposite to each other in the vehicle width direction.

In the power trunk line unit 2 according to the second embodiment, the PLC power trunk line 25, the second ground line 24, the second power trunk line 23, and the PLC ground line 26 are layered in this order in the thickness direction. The power branch line unit 3 according to the second embodiment includes a PLC power branch line 36, a PLC ground branch line 37, a second power branch line 38, and a second ground branch line 39. The branch lines 36 to 39 are flat wiring materials. In the power branch line unit 3, the PLC power branch line 36, the second ground branch line 39, the second power branch line 38, and the PLC ground branch line 37 are layered in this order in the thickness direction. The second power branch line 38 and the second ground branch line 39 serve as a power line unit of the high-voltage system. The PLC power branch line 36 and the PLC ground branch line 37 serve as a power line unit of the low-voltage system for PLC.

Two power trunk line units 2 are connected to the active branching unit 9 in different directions. In the following description, the PLC power trunk line 25 inserted into the active branching unit 9 from one side in the vehicle longitudinal direction is referred to as a first PLC power trunk line 25a, and the PLC power trunk line 25 inserted thereinto from the other side is referred to as a second PLC power trunk line 25b. Similarly, the PLC ground lines 26 are referred to as a first PLC ground line 26a and a second PLC ground line 26b. The PLC power branch line 36 inserted into the active branching unit 9 from one side in the vehicle width direction is referred to as a first PLC power branch line 36a, and the PLC power branch line 36 inserted thereinto from the other side is referred to as a second PLC power branch line 36b. Similarly, the PLC ground branch lines 37 are referred to as a first PLC ground branch line 37a and a second PLC ground branch line 37b.

As illustrated in FIG. 15, the active branching unit 9 includes a signal branching circuit 14. The signal branching circuit 14 branches signals of PLC (hereinafter, referred to as "PLC signals"). The signal branching circuit 14 operates by receiving electric power from the power trunk line unit 2. The signal branching circuit 14 is electrically connected to the two PLC power trunk lines 25a and 25b and the two PLC power branch lines 36a and 36b. The signal branching circuit 14 actively branches PLC signals between the two PLC power trunk lines 25a and 25b and the two PLC power branch lines 36a and 36b, thereby switching the communication paths for the PLC signals. As illustrated in FIG. 17, the signal branching circuit 14 according to the present embodiment includes two signal switching circuits 14a and 14b, two receiving circuits 14c and 14d, and two transmitting circuits 14e and 14f. The first signal switching circuit 14a is connected to the first PLC power trunk line 25a and the first PLC power branch line 36a. The second signal switching circuit 14b is connected to the second PLC power trunk line 25b and the second PLC power branch line 36b.

The first receiving circuit 14c and the first transmitting circuit 14e transmit PLC signals from the first signal switching circuit 14a to the second signal switching circuit 14b. The second receiving circuit 14d and the second transmitting circuit 14f transmit PLC signals from the second signal switching circuit 14b to the first signal switching circuit 14a. The first signal switching circuit 14a switches the destination of the PLC signals received from the first PLC power trunk line 25a to the first PLC power branch line 36a or the first receiving circuit 14c. The first signal switching circuit 14a switches the destination of the PLC signals received from the first PLC power branch line 36a to the first PLC power trunk line 25a or the first receiving circuit 14c. The first signal switching circuit 14a switches the destination of the PLC signals received from the second transmitting circuit 14f to the first PLC power trunk line 25a or the first PLC power branch line 36a.

The second signal switching circuit 14b switches the destination of the PLC signals received from the second PLC power trunk line 25b to the second PLC power branch line 36b or the second receiving circuit 14d. The second signal switching circuit 14b switches the destination of the PLC signals received from the second PLC power branch line 36b to the second PLC power trunk line 25b or the second receiving circuit 14d. The second signal switching circuit 14b switches the destination of the PLC signals received from the first transmitting circuit 14e to the second PLC power trunk line 25b or the second PLC power branch line 36b.

A power branching circuit 15 illustrated in FIG. 16 electrically connects the two PLC power trunk lines 25a and 25b and the two PLC power branch lines 36a and 36b to distribute electric power. The power branching circuit 15 has a function of attenuating the PLC signals, a function as a noise filter for the power, and a function of branching the power. As illustrated in FIGS. 16 and 18, the power branching circuit 15 according to the present embodiment includes a first inductor 15a, a second inductor 15b, a third inductor 15c, a fourth inductor 15d, and a capacitor 15e. The first inductor 15a is electrically connected to the first PLC power trunk line 25a. The second inductor 15b is electrically connected to the second PLC power trunk line 25b. The third inductor 15c is electrically connected to the first PLC power branch line 36a. The fourth inductor 15d is electrically connected to the second PLC power branch line 36b. The sides of the inductors 15a to 15d opposite to the sides connected to the PLC power trunk lines 25 and the PLC power branch lines 36 are electrically connected to each other and grounded via the capacitor 15e.

As illustrated in FIGS. 15 and 16, the active branching unit 9 includes a signal branching circuit 16. The signal branching circuit 16 has substantially the same configuration and functions as those of the signal branching circuit 14. The signal branching circuit 16 connects corresponding lines out of the two PLC ground lines 26a and 26b and the two PLC ground branch lines 37a and 37b depending on the switching of the communication paths performed by the signal branching circuit 14. If the signal branching circuit 14 transmits PLC signals from the first PLC power trunk line 25a to the first PLC power branch line 36a, for example, the signal branching circuit 16 connects the first PLC ground line 26a to the first PLC ground branch line 37a.

The active branching unit 9 electrically connects the two second ground lines 24 and the two second ground branch lines 39 and electrically connects the two second power trunk lines 23 and the two second power branch lines 38.

The PLC power branch lines 36 and the PLC ground branch lines 37 are connected to the electrical devices 13 via the distributors 12, for example. The electrical devices 13 serving as the connection destination are electrical devices 13 of the low-voltage system. The destination electrical devices 13 may include devices that do not perform PLC. The second power branch lines 38 and the second ground branch lines 39 are connected to the electrical devices 13 of the high-voltage system via the distributors 12, for example.

In the wire harness 1 according to the second embodiment, one active branching unit 9 distributes power and communications as described above. In other words, one active branching unit 9 intensively performs distribution of power and distribution of communications. This configuration can reduce the size and the weight of the wire harness 1 and simplify the wiring process. Furthermore, the active branching unit 9 actively and selectively distributes communications, thereby reducing the communication traffic and increasing the communication speed.

First Modification of the Second Embodiment

Figure 19:
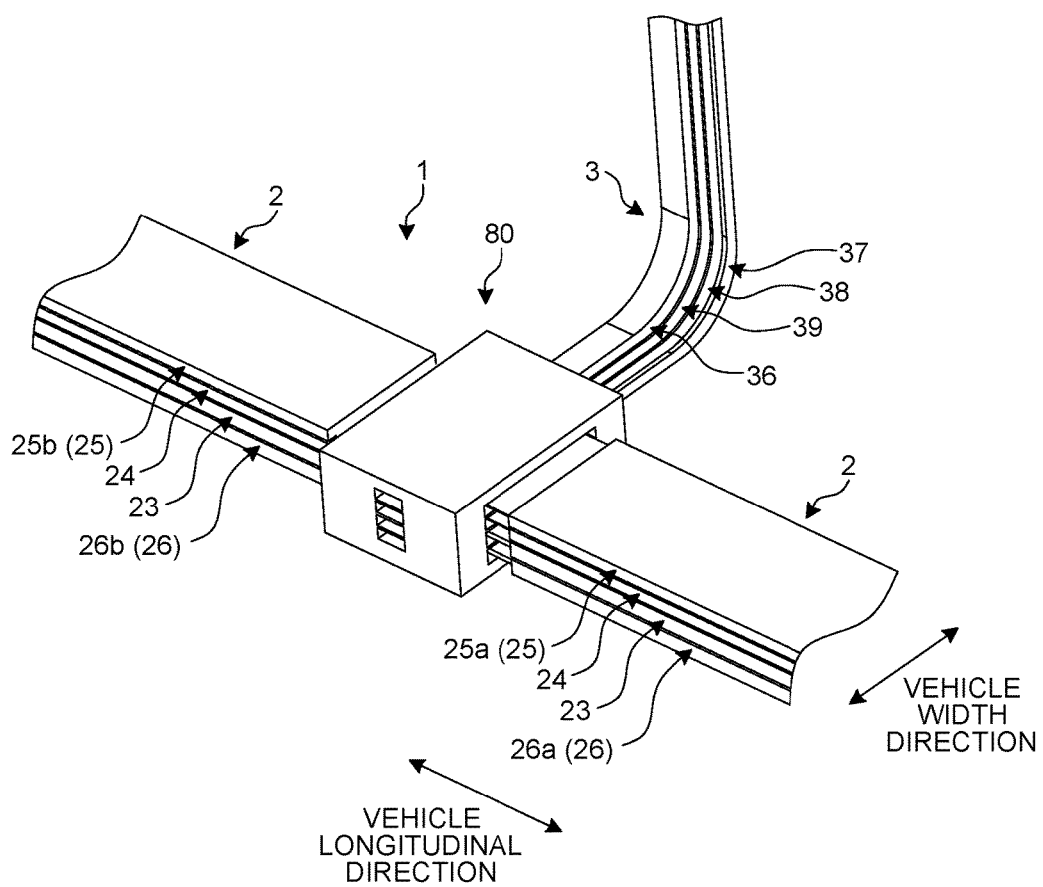
FIG. 19 is a perspective view of an appearance of the active branching unit according to a first modification of the second embodiment.
Figure 20:
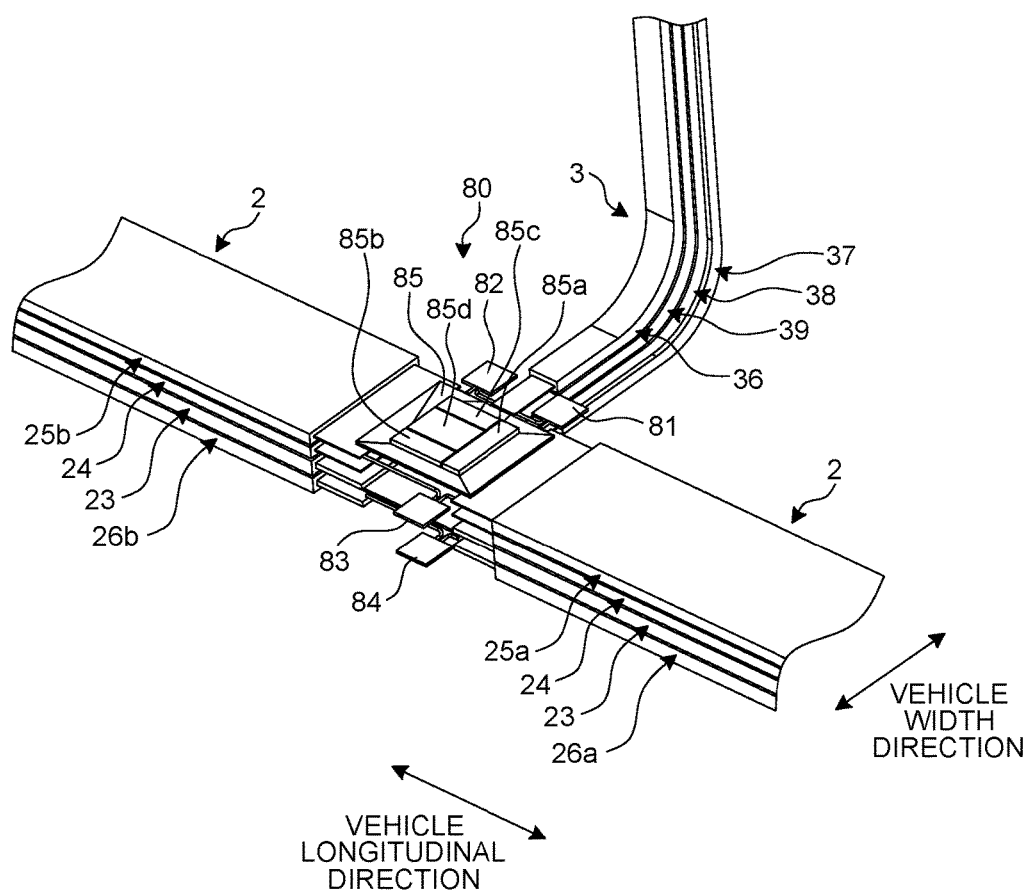
FIG. 20 is a perspective view of an inner part of the active branching unit according to the first modification of the second embodiment.

The following describes a first modification of the second embodiment. FIG. 19 is a perspective view of an appearance of the active branching unit according to the first modification of the second embodiment. FIG. 20 is a perspective view of an inner part of the active branching unit according to the first modification of the second embodiment. An active branching unit 80 according to the first modification of the second embodiment branches the power and the PLC signals into three directions. Two power trunk line units 2 are inserted into the active branching unit 80 in different directions along the vehicle longitudinal direction. One power branch line unit 3 is inserted into the active branching unit 80 from one side in the vehicle width direction.

The components of the power trunk line unit 2 and the power branch line unit 3 are the same as those according to the second embodiment. As illustrated in FIG. 20, the active branching unit 80 includes a first branching circuit 81, a second branching circuit 82, a third branching circuit 83, a fourth branching circuit 84, and a power branching circuit 85. The first branching circuit 81 is arranged between the first PLC power trunk line 25a and the PLC power branch line 36. The first branching circuit 81 electrically connects the first PLC power trunk line 25a and the PLC power branch line 36 or breaks the electrical connection therebetween. The second branching circuit 82 is arranged between the second PLC power trunk line 25b and the PLC power branch line 36. The second branching circuit 82 electrically connects the second PLC power trunk line 25b and the PLC power branch line 36 or breaks the electrical connection therebetween. The third branching circuit 83 is arranged between the first PLC power trunk line 25a and the second PLC power trunk line 25b. The third branching circuit 83 electrically connects the first PLC power trunk line 25a and the second PLC power trunk line 25b or breaks the electrical connection therebetween.

The active branching unit 80 includes a branching circuit that selectively connects the first PLC ground line 26a, the second PLC ground line 26b, and the PLC ground branch line 37. The fourth branching circuit 84, for example, is arranged between the first PLC ground line 26a and the second PLC ground line 26b. The fourth branching circuit 84 electrically connects the first PLC ground line 26a and the second PLC ground line 26b or breaks the electrical connection therebetween. The active branching unit 80 further includes a branching circuit that optionally connects the first PLC ground line 26a and the PLC ground branch line 37 and a branching circuit that optionally connects the second PLC ground line 26b and the PLC ground branch line 37.

The power branching circuit 85 includes a first inductor 85a, a second inductor 85b, a third inductor 85c, and a capacitor 85d. The first inductor 85a is electrically connected to the first PLC power trunk line 25a. The second inductor 85b is electrically connected to the second PLC power trunk line 25b. The third inductor 85c is electrically connected to the PLC power branch line 36. The inductors 85a to 85c are grounded via the common capacitor 85d.

Third Embodiment

Figure 21:
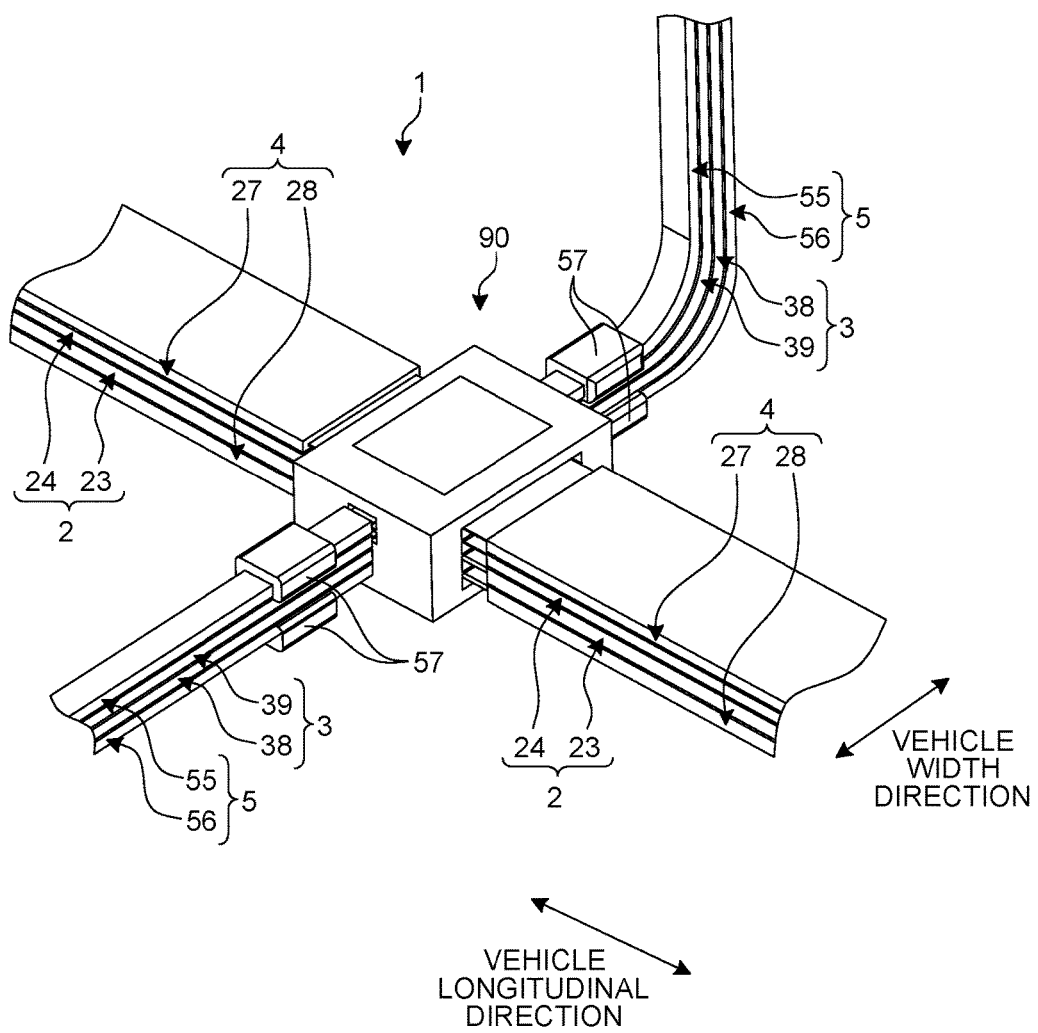
FIG. 21 is a perspective view of an appearance of the terminal block according to a third embodiment of the present invention.
Figure 22:
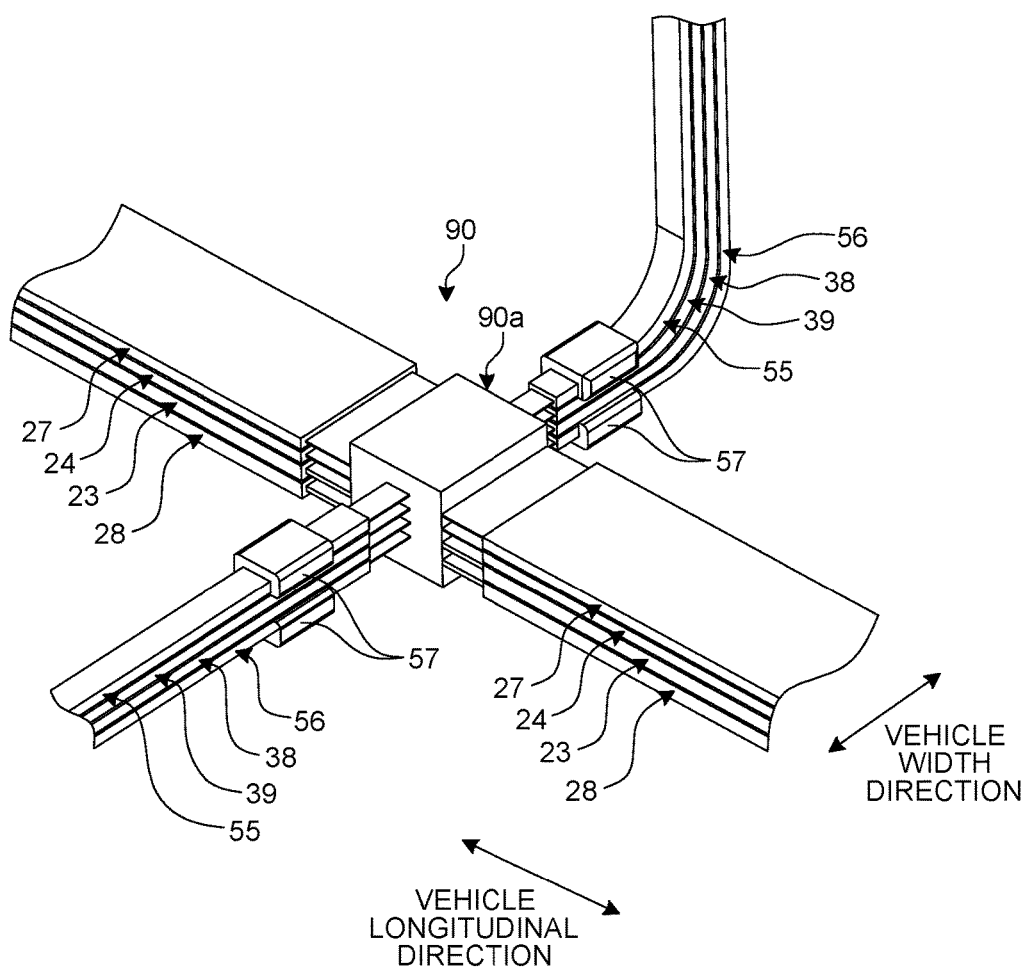
FIG. 22 is a perspective view of an inner part of the terminal block according to the third embodiment.

A third embodiment according to the present invention is described with reference to FIGS. 21 and 22. Components of the third embodiment having the same functions as those described in the first and the second embodiments are denoted by like reference numerals, and overlapping explanation thereof is omitted. FIG. 21 is a perspective view of an appearance of the terminal block according to the third embodiment. FIG. 22 is a perspective view of an inner part of the terminal block according to the third embodiment. One terminal block 90 according to the third embodiment passively branches power and communications.

The terminal block 90 has a rectangular parallelepiped shape. The power trunk line units 2 and the communication trunk lines 4 are inserted into the terminal block 90 from both sides in the vehicle longitudinal direction. The power trunk line units 2 each include the second power trunk line 23 and the second ground line 24. The communication trunk lines 4 each include the flat signal line 27 and the flat ground line 28. The flat signal line 27, the second ground line 24, the second power trunk line 23, and the flat ground line 28 are layered in this order. The power branch line units 3 and the communication branch lines 5 are inserted into the terminal block 90 from both sides in the vehicle width direction. The power branch line units 3 each include the second power branch line 38 and the second ground branch line 39. The communication branch lines 5 each include a flat signal branch line 55 and a flat ground branch line 56. The flat signal branch line 55 and the flat ground branch line 56 are flat wiring materials similar to those of the second power branch line 38 and the second ground branch line 39. The flat signal branch line 55, the second ground branch line 39, the second power branch line 38, and the flat ground branch line 56 are layered in this order.

As illustrated in FIG. 22, the terminal block 90 includes a branching unit 90a. The branching unit 90a connects the two flat signal lines 27 and the two flat signal branch lines 55 via ferrite. The branching unit 90a connects the two second ground lines 24 and the two second ground branch lines 39 via ferrite. The branching unit 90a connects the two second power trunk lines 23 and the two second power branch lines 38 via ferrite. The branching unit 90a connects the two flat ground lines 28 and the two flat ground branch lines 56 via ferrite.

The two flat signal branch lines 55 and the two flat ground branch lines 56 are provided with respective ferrite cores 57.

First Modification of the Third Embodiment

Figure 23:
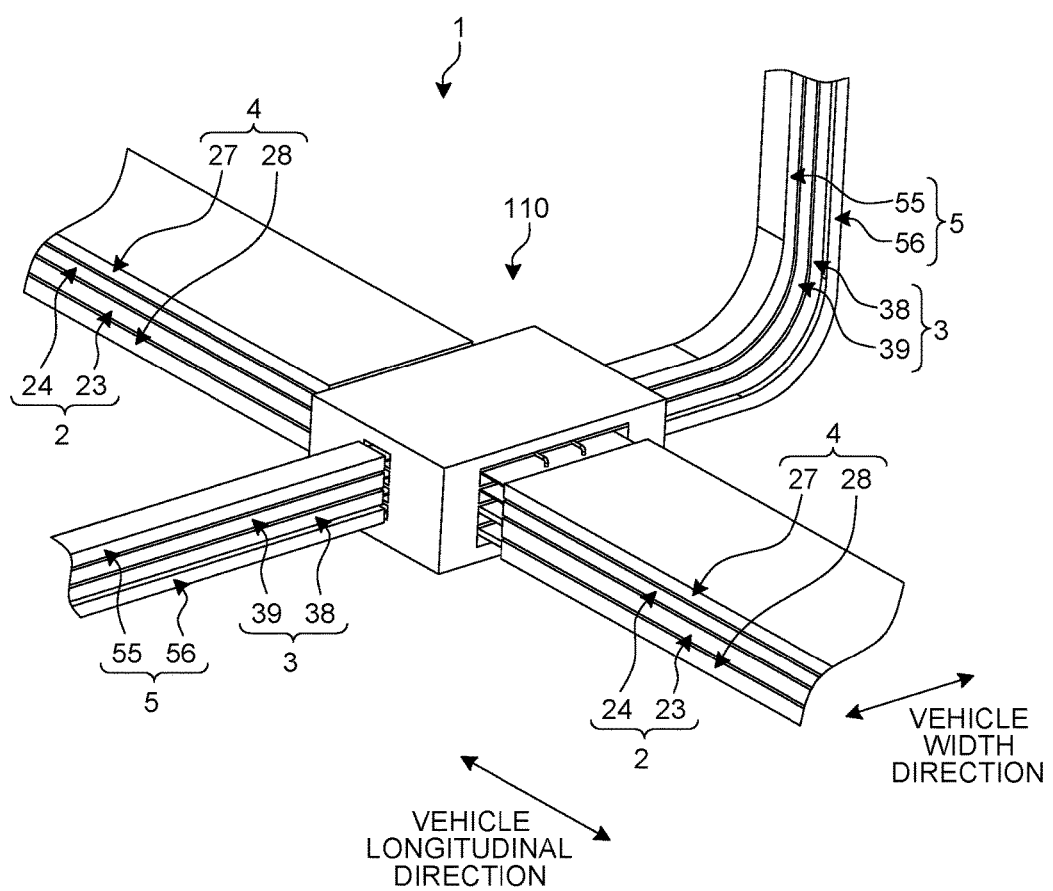
FIG. 23 is a perspective view of an appearance of the terminal block according to a first modification of the third embodiment.
Figure 24:
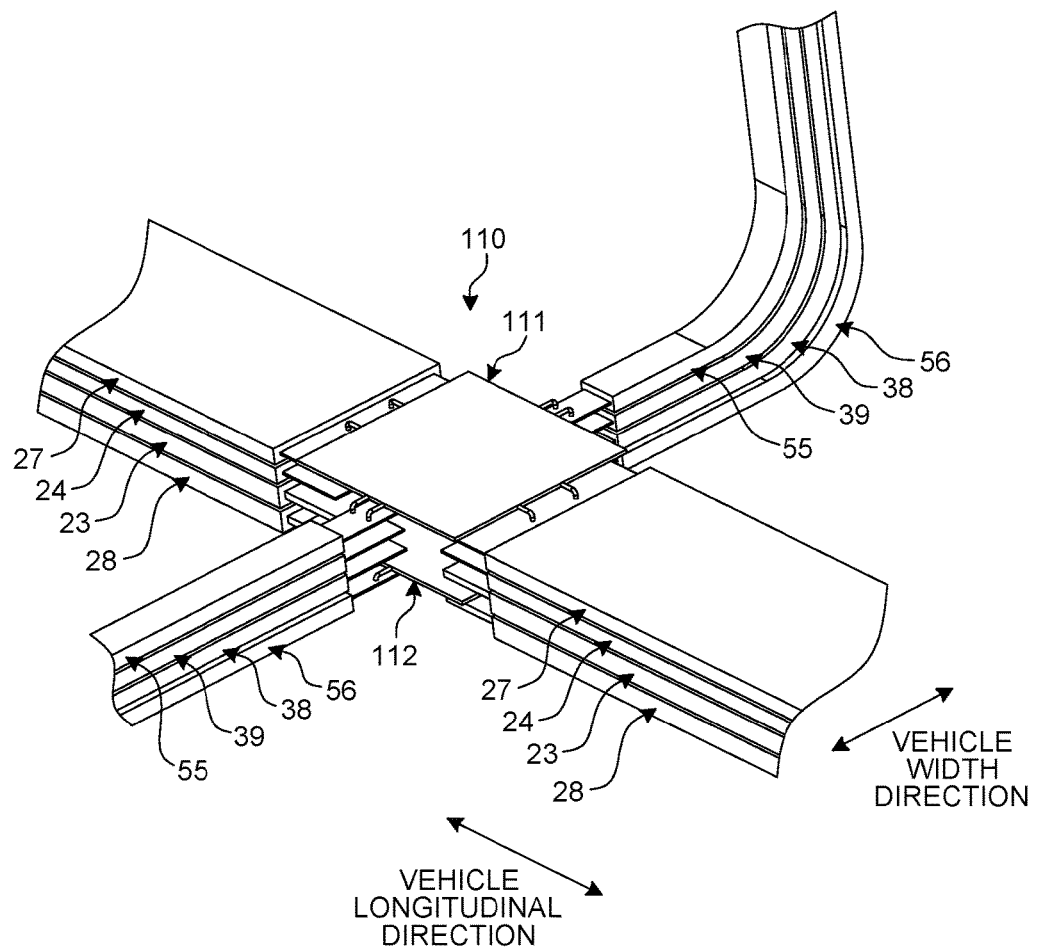
FIG. 24 is a perspective view of an inner part of the terminal block according to the first modification of the third embodiment.

The following describes a first modification of the third embodiment. FIG. 23 is a perspective view of an appearance of the terminal block according to the first modification of the third embodiment. FIG. 24 is a perspective view of an inner part of the terminal block according to the first modification of the third embodiment. A terminal block 110 according to the present modification connects power lines and connects communication lines using resistors instead of ferrite.

As illustrated in FIG. 23, the terminal block 110 has a rectangular parallelepiped shape. The power trunk line units 2 and the communication trunk lines 4 are inserted into the terminal block 110 from both sides in the vehicle longitudinal direction. The power branch line units 3 and the communication branch lines 5 are inserted into the terminal block 110 from both sides in the vehicle width direction. Components of the power trunk line units 2, the power branch line units 3, the communication trunk lines 4, and the communication branch lines 5 are the same as those according to the third embodiment. As illustrated in FIG. 24, the terminal block 110 includes branching units 111 and 112. The branching unit 111 connects the two flat signal lines 27 and the two flat signal branch lines 55 via resistors. The branching unit 112 connects the two flat ground lines 28 and the two flat ground branch lines 56 via resistors. The terminal block 110 connects the two second power trunk lines 23 and the two second power branch lines 38 and connects the two second ground lines 24 and the two second ground branch lines 39.

Second Modification of the Third Embodiment

Figure 25:
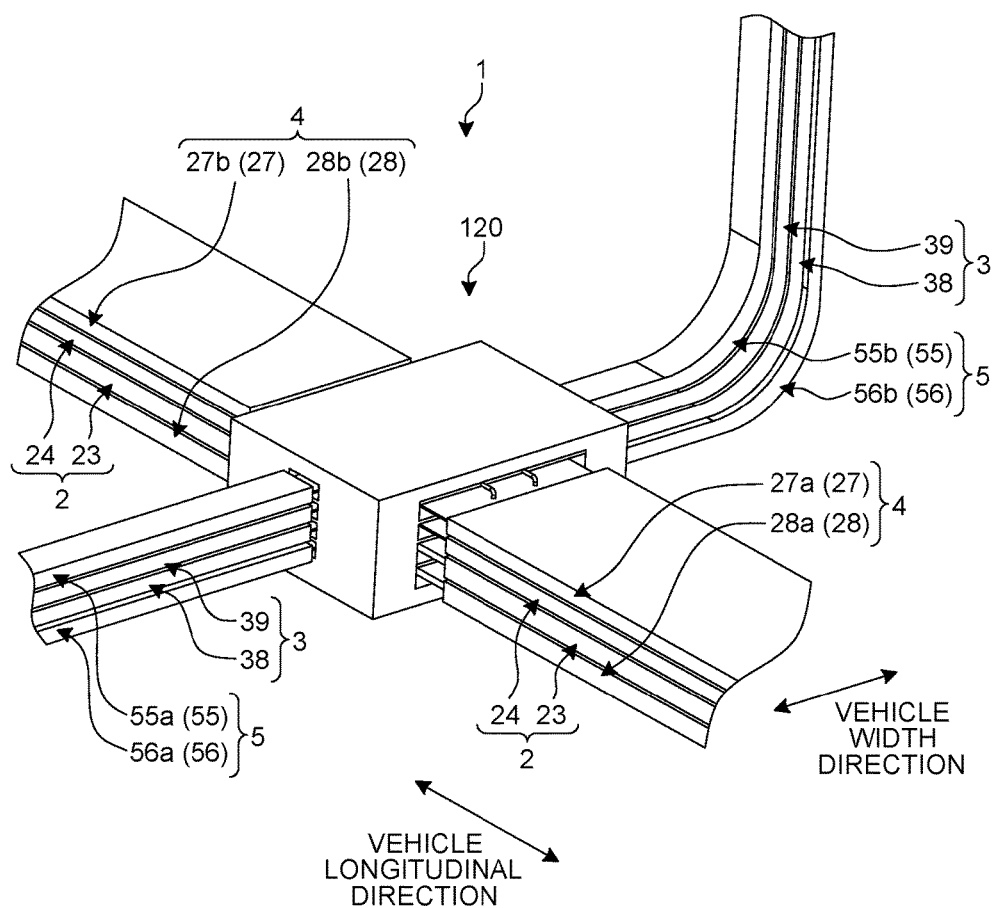
FIG. 25 is a perspective view of an appearance of the active branching unit according to a second modification of the third embodiment.
Figure 26:
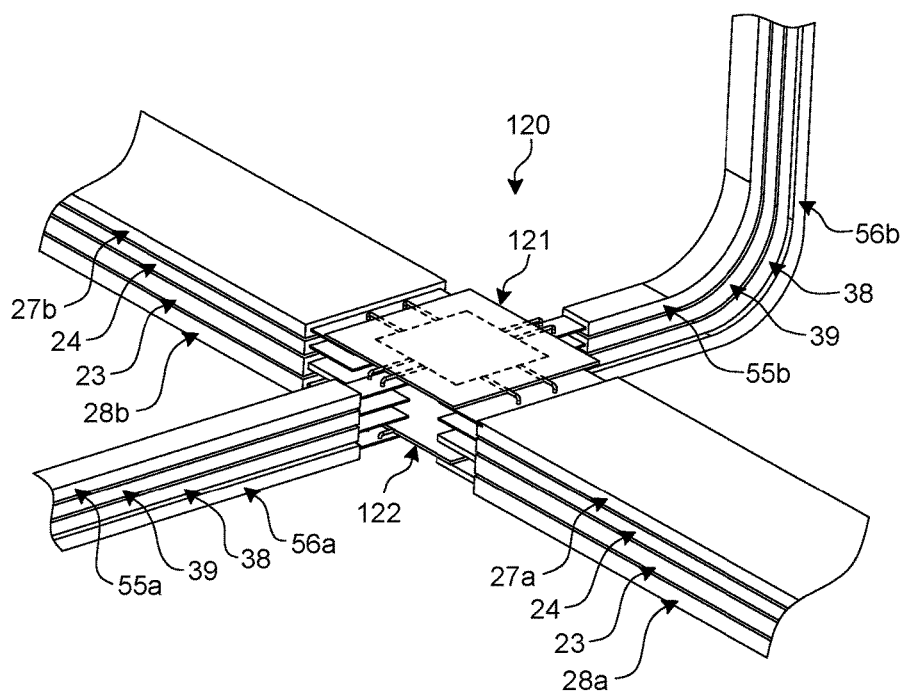
FIG. 26 is a perspective view of an inner part of the active branching unit according to the second modification of the third embodiment.
Figure 27:
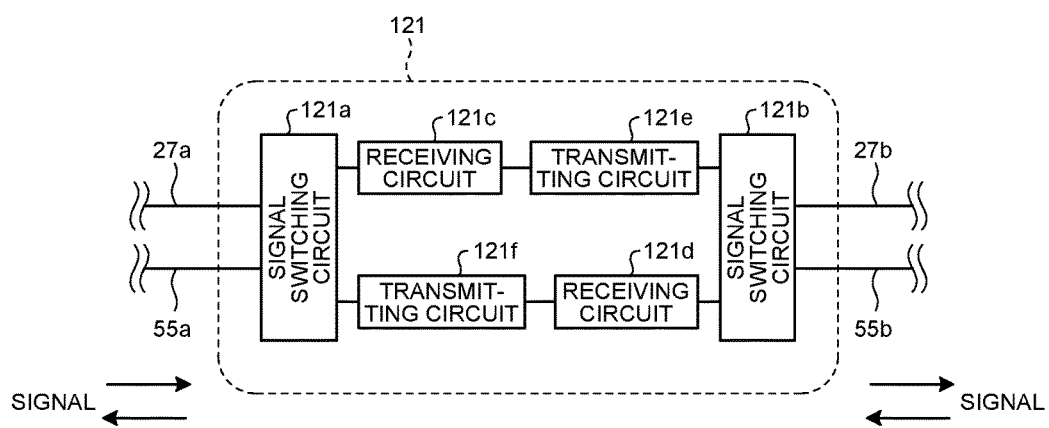
FIG. 27 is a block diagram of a signal branching circuit according to the second modification of the third embodiment.

The following describes a second modification of the third embodiment. FIG. 25 is a perspective view of an appearance of the active branching unit according to the second modification of the third embodiment. FIG. 26 is a perspective view of an inner part of the active branching unit according to the second modification of the third embodiment. FIG. 27 is a block diagram of the signal branching circuit according to the second modification of the third embodiment.

As illustrated in FIG. 25, an active branching unit 120 has a rectangular parallelepiped shape. The power trunk line units 2 and the communication trunk lines 4 are inserted into the active branching unit 120 from both sides in the vehicle longitudinal direction. The power branch line units 3 and the communication branch lines 5 are inserted into the active branching unit 120 from both sides in the vehicle width direction. Components of the power trunk line units 2, the power branch line units 3, the communication trunk lines 4, and the communication branch lines 5 are the same as those according to the third embodiment. The flat signal line 27 inserted into the active branching unit 120 from one side in the vehicle longitudinal direction is referred to as a first flat signal line 27a, and the flat signal line 27 inserted thereinto from the other side is referred to as a second flat signal line 27b. Similarly, the flat ground lines 28 are referred to as a first flat ground line 28a and a second flat ground line 28b. The flat signal branch line 55 inserted into the active branching unit 120 from one side in the vehicle width direction is referred to as a first flat signal branch line 55a, and the flat signal branch line 55 inserted thereinto from the other side is referred to as a second flat signal branch line 55b. Similarly, the flat ground branch lines 56 are referred to as a first flat ground branch line 56a and a second flat signal branch line 56b.

As illustrated in FIG. 26, the active branching unit 120 includes signal branching circuits 121 and 122. As illustrated in FIG. 27, the signal branching circuit 121 includes signal switching circuits 121a and 121b, receiving circuits 121c and 121d, and transmitting circuits 121e and 121f. The signal switching circuits 121a and 121b are similar to the signal switching circuits 14a and 14b according to the second embodiment. The receiving circuits 121c and 121d are similar to the receiving circuits 14c and 14d. The transmitting circuits 121e and 121f are similar to the transmitting circuits 14e and 14f. The first signal switching circuit 121a is connected to the first flat signal line 27a and the first flat signal branch line 55a. The second signal switching circuit 121b is connected to the second flat signal line 27b and the second flat signal branch line 55b. The signal branching circuit 121 actively branches signals between the two flat signal lines 27a and 27b and the two flat signal branch lines 55a and 55b.

The signal branching circuit 122 has substantially the same configuration and functions as those of the signal branching circuit 121. The signal branching circuit 122 connects corresponding lines out of the two flat ground lines 28a and 28b and the two flat ground branch lines 56a and 56b depending on the switching of the communication paths performed by the signal branching circuit 121.

Third Modification of the Third Embodiment

Figure 28:
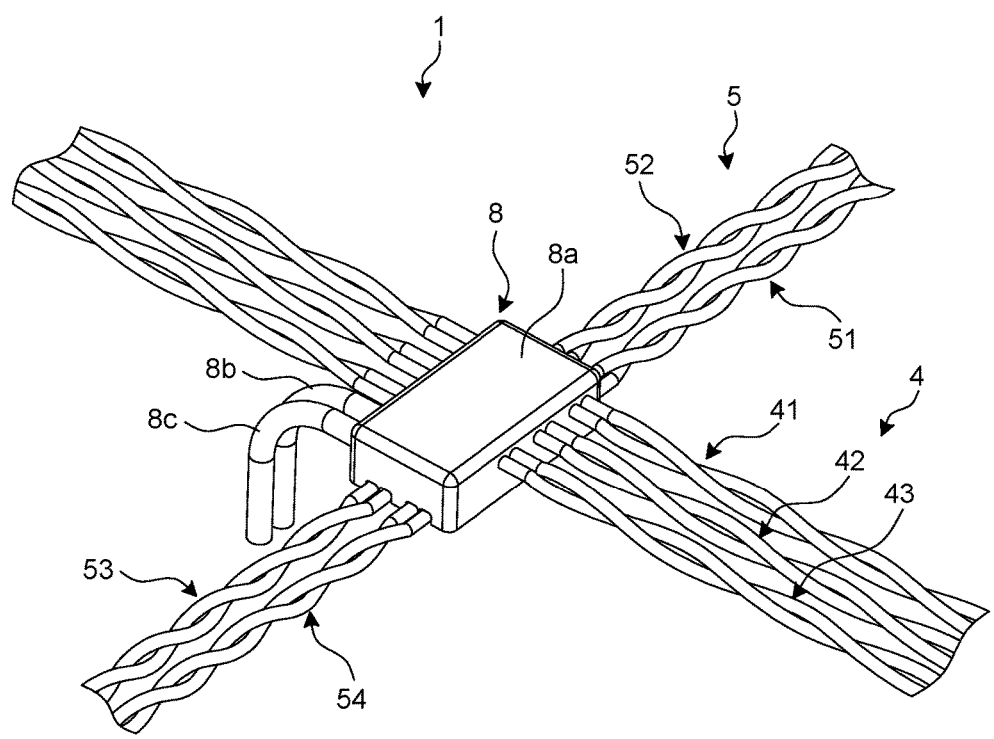
FIG. 28 is a perspective view of the active branching unit according to a third modification of the third embodiment.

The following describes a third modification of the third embodiment. FIG. 28 is a perspective view of the active branching unit according to the third modification of the third embodiment. An active branching unit 8 according to the present modification actively branches communication signals between communication lines made of twisted electric wires. The active branching unit 8 is arranged between the communication trunk lines 4 and the communication branch lines 5 to control communications. The active branching unit 8 includes a signal branching circuit 8a, a power line 8b, and a ground line 8c. The power line 8b is connected to the first power trunk line 21 or the first power branch line 31 of the low-voltage system, for example. The ground line 8c is connected to the first ground line 22 or the first ground branch line 32 of the low-voltage system, for example. In other words, the signal branching circuit 8a operates by electric power supplied from the power line of the wire harness 1. Consequently, the present modification does not require any dedicated power line arranged from the battery 103 to the active branching unit 8.

The signal branching circuit 8a is connected to communication trunk lines 41, 42, and 43, and communication branch lines 51, 52, 53, and 54. The signal branching circuit 8a selectively allows any two or more lines out of the communication trunk lines 41 to 43 and the communication branch lines 51 to 54 to transmit and receive signals to and from each other.

Fourth Embodiment

Figure 29:
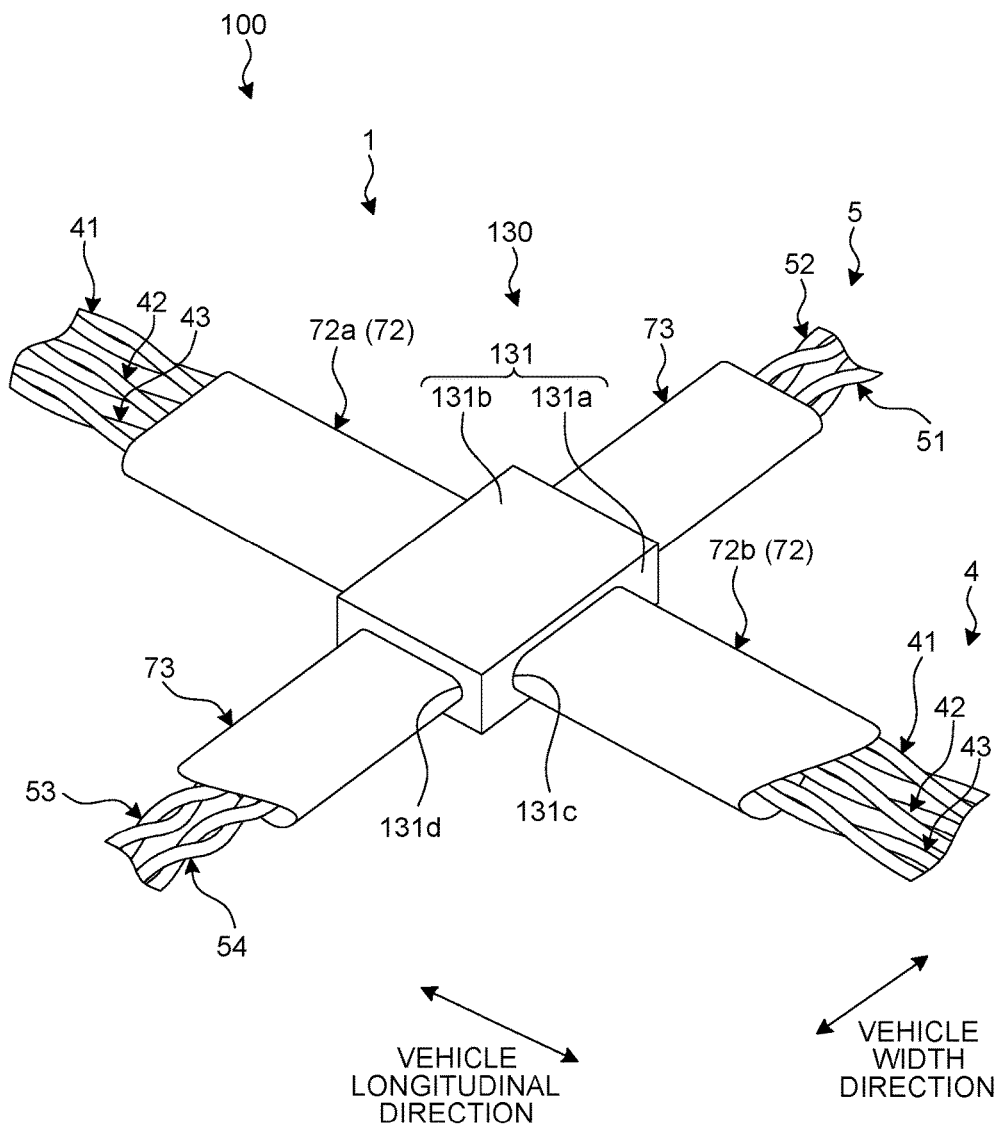
FIG. 29 is a perspective view of a terminal block and pipes according to a fourth embodiment of the present invention.
Figure 30:
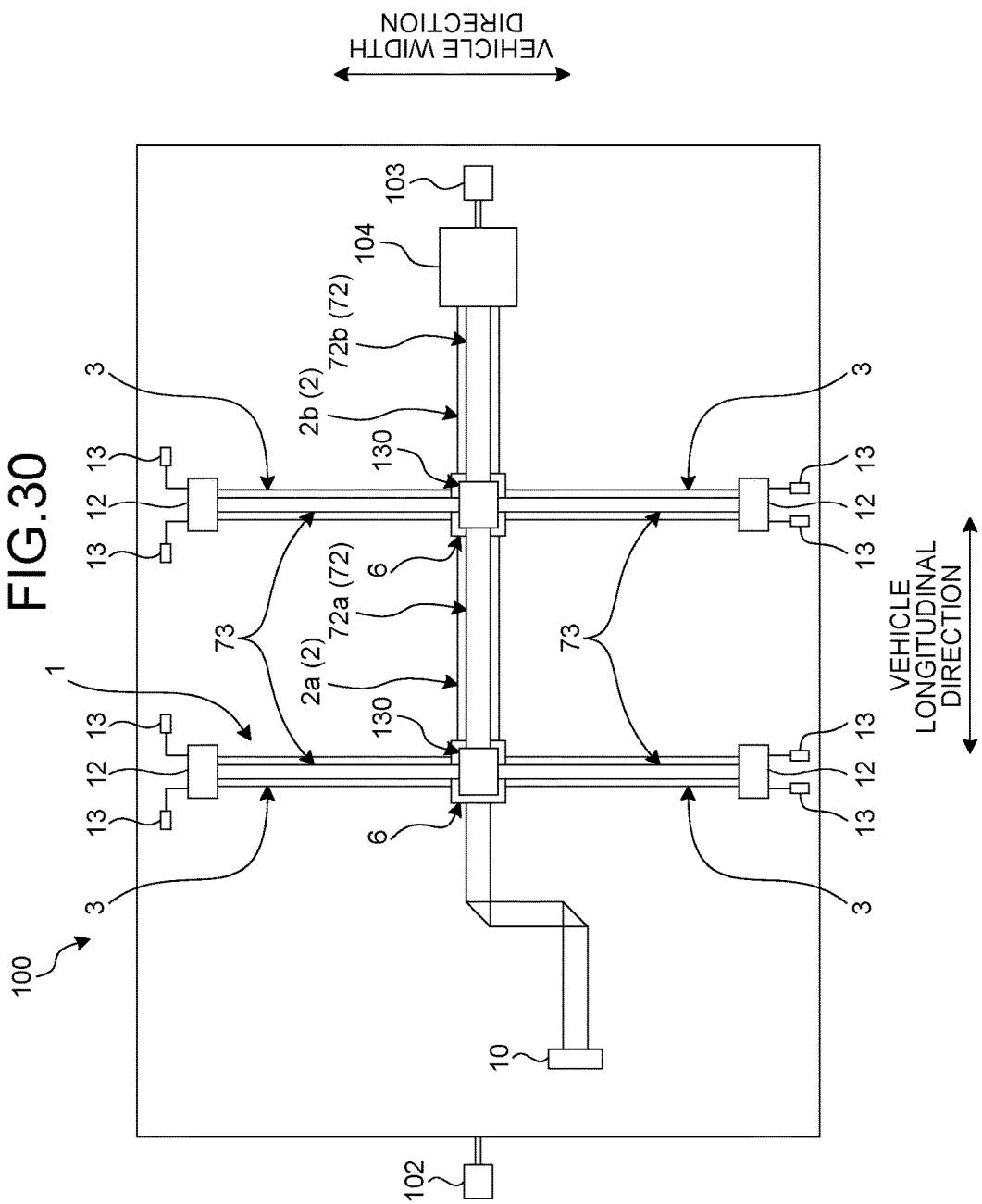
FIG. 30 is a plan view of a vehicle according to the fourth embodiment.
Figure 31:
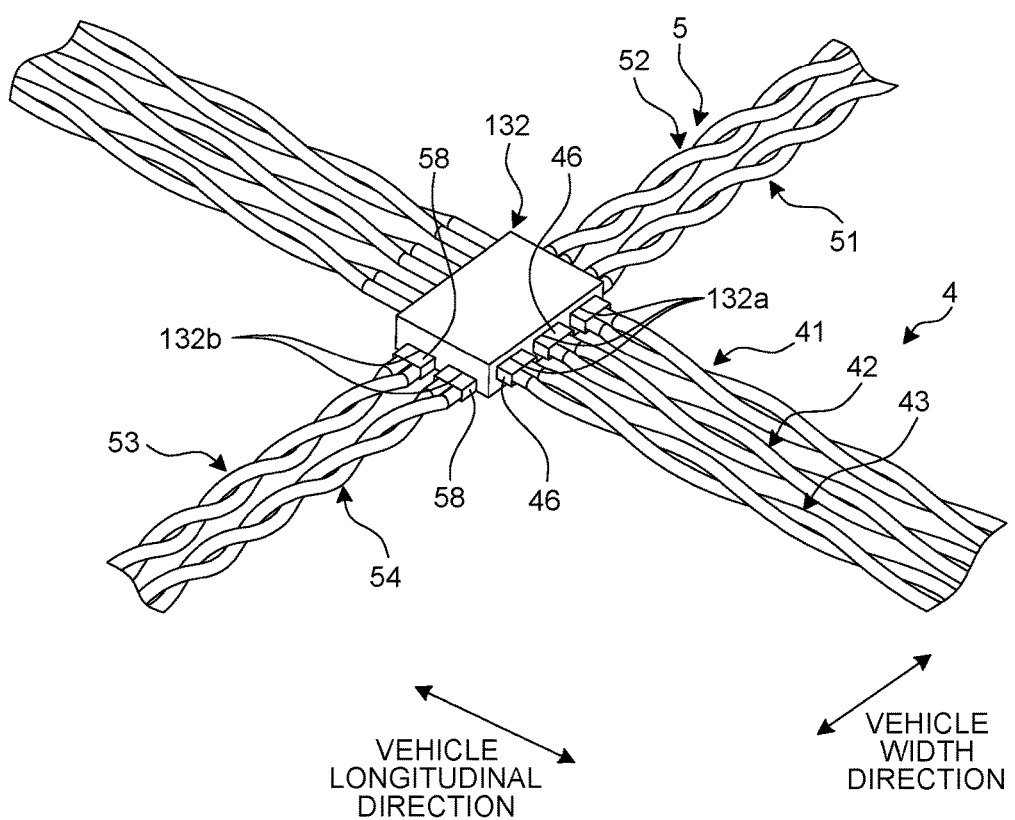
FIG. 31 is a perspective view of a branching unit according to the fourth embodiment.

A fourth embodiment according to the present invention is described with reference to FIGS. 29 to 31. Components of the fourth embodiment having the same functions as those described in the first to the third embodiments are denoted by like reference numerals, and overlapping explanation thereof is omitted. FIG. 29 is a perspective view of a terminal block and pipes according to the fourth embodiment, FIG. 30 is a plan view of a vehicle according to the fourth embodiment, and FIG. 31 is a perspective view of a branching unit according to the fourth embodiment. The fourth embodiment differs from the first to the third embodiments in that, for example, the communication trunk line 4 is inserted in a trunk pipe 72 and the communication branch line 5 is inserted in a branch pipe 73.

As illustrated in FIGS. 29 and 30, the wire harness 1 according to the fourth embodiment includes trunk pipes 72 and branch pipes 73. A trunk pipe 72 is a tubular member extending in the vehicle longitudinal direction. A branch pipe 73 is a tubular member extending in the direction intersecting with the vehicle longitudinal direction. The branch pipes 73 according to the fourth embodiment are orthogonal to the trunk pipes 72 and extend in the vehicle width direction. The trunk pipes 72 and the branch pipes 73 are made of, for example, metal or synthetic resin. The pipes 72 and 73 are rigid enough to keep at least a desired tubular shape. The pipes 72 and 73 may be rigid enough to protect the communication trunk line 4 and the communication branch line 5 inserted in the pipes. The pipes 72 and 73 may electromagnetically insulate the communication trunk line 4 and the communication branch line 5 from outside environment in order to prevent degradation of communication quality caused by the communication trunk line 4 and the communication branch line 5.

As illustrated in FIG. 30, the trunk pipes 72 extend along the power trunk line unit 2. The trunk pipes 72 extend, for example, along the upper surface of the power trunk line unit 2. The wire harness 1 according to the fourth embodiment includes two trunk pipes 72. A trunk pipe 72b of the trunk pipes 72 extends along the vehicle rear-side range 2b in the power trunk line unit 2. The trunk pipe 72b connects the power source controller 104 with a terminal block 130. The communication trunk line 4 arranged along the vehicle rear-side range 2b is inserted in the trunk pipe 72b.

The other trunk pipe 72a of the trunk pipes 72 extends along the intermediate range 2a in the power trunk line unit 2. The trunk pipe 72a connects two terminal blocks 130. The communication trunk line 4 arranged along the intermediate range 2a is inserted in the trunk pipe 72a.

The vehicle 100 according to the fourth embodiment includes four branch pipes 73. Each branch pipe 73 connects the terminal block 130 with the distributor 12. The communication branch lines 5 are inserted in the branch pipes 73.

As illustrated in FIG. 29, the trunk pipes 72 and the branch pipes 73 according to the fourth embodiment have an elongated circular cross-section. The height of the cross-section of the trunk pipes 72 and the branch pipes 73 is shorter than the width of the cross-section thereof. This structure can reduce the height of the wiring space. Three pairs of communication trunk lines 41, 42, and 43 are arranged in the trunk pipe 72 along the longitudinal direction of the trunk pipe 72. The communication branch lines 51 and 52 and the communication branch lines 53 and 54 are arranged in the branch pipes 73 along the longitudinal direction of the branch pipes 73.

The terminal block 130 has a housing 131. The housing 131 has a main portion 131a as an accommodating portion and a lid 131*b*. The main portion 131*a* is a tubular member with a bottom and an upper opening. The lid 131*b* closes the opening of the main portion 131*a*. Closing the opening of the main portion 131*a* with the lid 131*b* forms a rectangular parallelepiped housing 131. The lid 131*b* is detachably attached to the main portion 131*a*.

The trunk pipes 72 are connected to side surfaces of the main portion 131*a* facing in the vehicle longitudinal direction. The main portion 131*a* according to the fourth embodiment has openings 131*c* into which the trunk pipes 72 can be inserted. The trunk pipes 72 are inserted into the openings 131*c* and fitted with the main portion 131*a*. The branch pipes 73 are connected to side surfaces of the main portion 131*a* facing in the vehicle width direction. The main portion 131*a* has openings 131*d* into which the branch pipes 73 can be inserted. The branch pipes 73 are inserted into the openings 131*d* and fitted with the main portion 131*a*.

The housing 131 includes a branching unit 132 illustrated in FIG. 31. The branching unit 132 according to the fourth embodiment has a rectangular parallelepiped shape. The branching unit 132 has insertion slots 132*a* and 132*b*. The insertion slots 132*a* are openings into which the communication trunk lines 41, 42, and 43 are inserted. The insertion slots 132*a* are formed on side surfaces of the branching unit 132 facing in the vehicle longitudinal direction. Ends of the tree pairs of the communication trunk lines 41, 42, and 43 are connected to connectors 46. The connectors 46 connected to the three pairs of the communication trunk lines 41, 42, and 43 are inserted in different insertion slots 132*a* and fitted with the branching unit 132. The insertion slots 132*b* are openings into which the communication branch lines 5 are inserted. The insertion slots 132*b* are formed on side surfaces of the branching unit 132 facing in the vehicle width direction. Ends of the communication branch lines 51, 52, 53, and 54 are connected to connectors 58. The connectors 58 connected to the communication branch lines 51, 52, 53, and 54 are inserted in different insertion slots 132*b* and fitted with the branching unit 132.

The connectors 46 and the connectors 58 are detachably attached to the branching unit 132. More specifically, the connectors 46 and 58 and the branching unit 132 are configured such that a worker can attach or detach the connectors 46 and 58 to and from the branching unit 132 with the lid 131*b* of the terminal block 130 being detached from the main portion 131*a*.

The branching unit 132 according to the fourth embodiment passively branches communications. The branching unit 132 electrically connects the signal lines of the first communication trunk line 41 and the first communication branch line 51 and electrically connects the ground lines thereof. The branching unit 132 electrically connects the signal lines of the second communication trunk line 42 and the second communication branch line 52 and electrically connects the ground lines thereof. The branching unit 132 electrically connects the signal lines of the second communication trunk line 42 and the second communication branch line 54 and electrically connects the ground lines thereof. The branching unit 132 electrically connects the signal lines of the third communication trunk line 43 and the first communication branch line 53 and electrically connects the ground lines thereof.

The form of connection between the trunk pipe 72 and the power source controller 104 is the same as the form of connection between the trunk pipe 72 and the terminal block 130. In other words, the trunk pipe 72 is connected to the housing of the power source controller 104. The form of connection between the communication trunk line 4 and the power source controller 104 is the same as the form of connection between the communication trunk line 4 and the terminal block 130. In other words, an end of the communication trunk line 4 close to the power source controller 104 is connected to the connectors 46. The connectors 46 are detachably attached to a control circuit of the power source controller 104. The housing of the power source controller 104 can be opened so that the worker can attach or detach the connectors 46 to and from the power source controller 104.

The form of connection between the branch pipe 73 and the distributor 12 is the same as the form of connection between the branch pipe 73 and the terminal block 130. In other words, the branch pipe 73 is connected to the housing of the distributor 12. The form of connection between the communication branch line 5 and the distributor 12 is the same as the form of connection between the communication branch line 5 and the terminal block 130. In other words, an end of the communication branch line 5 close to the distributor 12 is connected to the connectors 58. The connectors 58 are detachably attached to a distribution circuit of the distributor 12. The housing of the distributor 12 can be opened so that the worker can attach or detach the connectors 58 to and from the distributor 12.

The wire harness 1 configured as described above facilitates replacement of the communication trunk line 4 and the communication branch line 5. For example, replacement work for replacing the communication trunk line 4 and the communication branch line 5 can be readily performed by removing a part of the interior material of the vehicle. The compartment of the vehicle is provided with an interior material such as a formed carpet that covers the floor panel 101 and the wire harness 1 from above. Portions of the interior material facing the terminal blocks 130, the distributors 12, and the power source controller 104 are detachably attached to these components. The worker can readily perform the replacement work of the communication trunk line 4 and the communication branch line 5 by detaching the portions of the interior material facing the terminal blocks 130, the distributors 12, and the power source controller 104 from these components.

When a device installed in the vehicle 100 having relatively low communication speed is replaced with a device having a high communication speed, the communication trunk line 4 and the communication branch line 5 need to be replaced. In this regard, the wire harness 1 according to the fourth embodiment facilitates replacement of the communication trunk line 4 and the communication branch line 5. When, for example, the worker replaces the communication trunk line 4 connecting two terminal blocks 130, the worker detaches the portions of the interior material facing the terminal blocks 130 from the terminal blocks 130. The worker then detaches the respective lid 131*b* from the two block terminals 130 and detaches connectors 46 from the respective branching units 132. The detached communication trunk line 4 is pulled out from an end of the trunk pipe 72*a*. A new communication trunk line 4 is inserted from an opening at an end of the trunk pipe 72*a* to the other end of the trunk pipe 72*a*. If the worker firmly attaches the new communication trunk line 4 to an end of the detached communication trunk line 4, the worker can pull out the detached communication trunk line 4 and insert the new communication trunk line 4 simultaneously. Connectors 46 of the new communication trunk line 4 are connected to the two branching units 132 and the replacement of the communication trunk line 4 is finished. Replacement of the communication branch line 5 is performed in the same manner as the replacement of the communication trunk line 4.

While the wire harness 1 according to the fourth embodiment includes both trunk pipe 72 and branch pipe 73, the embodiment is not limited to this. The wire harness 1 may include at least one of the trunk pipe 72 and the branch pipe 73. If the wire harness 1 includes the trunk pipe 72, a portion of the communication trunk line 4 is not necessarily accommodated in the trunk pipe 72. If the wire harness 1 includes the branch pipe 73, a portion of the communication branch line 5 is not necessarily accommodated in the branch pipe 73.

The branching unit 132 is not limited to a unit that passively branches communications. The branching unit 132 may have the same configurations and functions as those of the active branching units 8, 9, 80, and 120 described in the first to the third embodiments.

First Modification of the Fourth Embodiment

Figure 32:
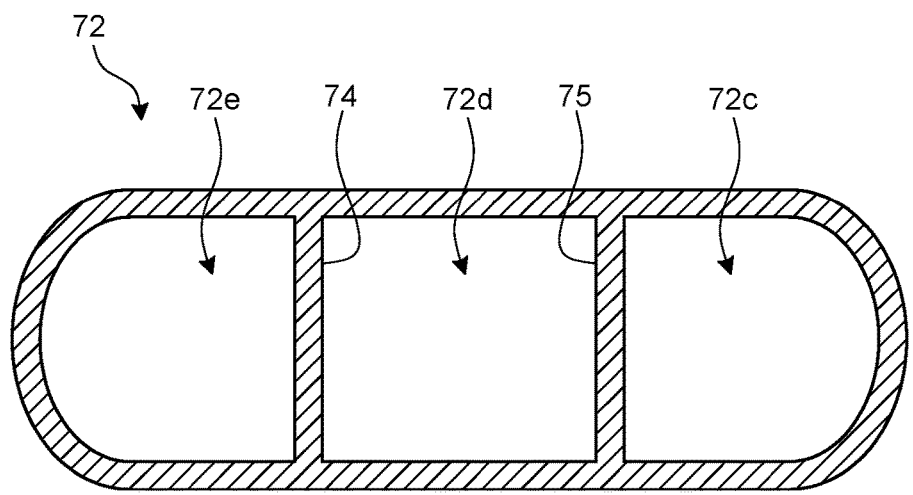
FIG. 32 is a sectional view of a trunk pipe according to a first modification of the fourth embodiment.

A first modification of the fourth embodiment will be described. FIG. 32 is a sectional view of a trunk pipe according to the first modification of the fourth embodiment. The trunk pipe 72 according to the first modification of the fourth embodiment includes separation walls 74 and 75.

The separation walls 74 and 75 are disposed inside the trunk pipe 72 and extend in the axial direction of the trunk pipe 72. The separation walls 74 and 75 separate the inner space of the trunk pipe 72 into a first path 72c, a second path 72d, and a third path 72e. The first path 72c is a path into which the first communication trunk line 41 is inserted. The second path 72d is a path into which the second communication trunk line 42 is inserted. The third path 72e is a path into which the third communication trunk line 43 is inserted. The trunk pipe 72 has the paths 72c, 72d, and 72e dedicated to the three pairs of communication trunk lines 41, 42, and 43, respectively, and this structure can improve workability in arranging the communication trunk line 4. For example, this structure can prevent the communication trunk lines 41, 42, and 43 from getting tangled in replacing the communication trunk line 4.

The branch pipe 73 may include a separation wall similar to the separation walls 74 and 75. The separation wall of the branch pipe 73 separates the inner space of the branch pipe 73 into, for example, a path for the first communication branch lines 51 and 53 and a path for the second communication branch lines 52 and 54.

Second Modification of the Fourth Embodiment

Figure 33:
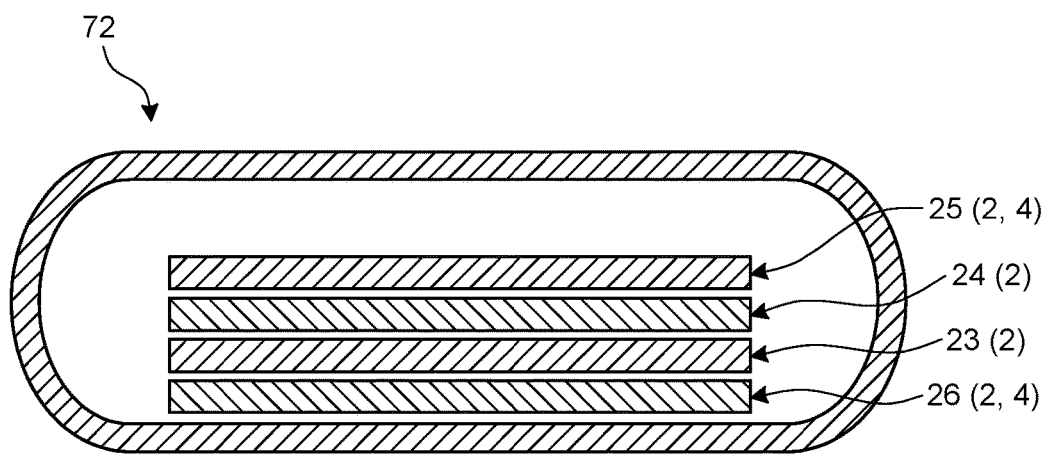
FIG. 33 is a sectional view of a trunk pipe according to a second modification of the fourth embodiment.

A second modification of the fourth embodiment will be described. FIG. 33 is a sectional view of a trunk pipe according to the second modification of the fourth embodiment. In the second modification of the fourth embodiment, the PLC power trunk line 25 and the PLC ground line 26 as the communication trunk line 4 are arranged in the trunk pipe 72.

As illustrated in FIG. 33, the PLC power trunk line 25, the second ground line 24, the second power trunk line 23, and the PLC ground line 26 are arranged in the trunk pipe 72. The PLC power trunk line 25, the second ground line 24, the second power trunk line 23, and the PLC ground line 26 are layered in this order from above to below. In this manner, the power trunk line unit 2 may be arranged inside the trunk pipe 72 as well as the communication trunk line 4. The communication trunk line 4 and the communication branch line 5 may be replaced, in some cases, to increase communication speed or may be replaced because of communication malfunction. The PLC power trunk line 25 and the PLC ground line 26 arranged inside the trunk pipe 72 can be replaced easily. The second power trunk line 23 and the second ground line 24 can also be replaced easily.

The PLC power branch line 36 and the PLC ground line 37 (refer to, for example, FIG. 14) as the communication branch line 5 may be arranged inside the branch pipe 73. In this case, the PLC power branch line 36, the second ground branch line 39, the second power branch line 38, and the PLC ground branch line 37 may be arranged inside the branch pipe 73. The PLC power branch line 36, the second ground branch line 39, the second power branch line 38, and the PLC ground branch line 37 are, for example, layered in this order from above to below.

Modifications of the Embodiments Above

The following describes modifications of the first to the fourth embodiments. The layering orders of the flat wiring materials are not limited to those described above. The PLC power trunk line 25 and the flat signal line 27, for example, may be arranged in a manner sandwiched by the ground lines from both sides in the layering direction. This configuration may possibly be able to reduce communication noise caused by radio waves travelling through the air.

The positions of the power trunk line unit 2 and the communication trunk line 4 are not limited to those described above. The positions of the power trunk line unit 2 and the communication trunk line 4 in the vehicle width direction on the floor panel 101 are not limited to the center and may be optionally determined. The power trunk line unit 2 and the communication trunk line 4 may be arranged along a portion other than the upper surface of the floor panel 101. Alternatively, the power trunk line unit 2 and the communication trunk line 4 may be arranged along a part other than the floor panel 101 in the vehicle 100.

The contents disclosed in the embodiments and the modifications above may be appropriately combined.

The wire harness according to the present embodiments includes a power trunk line, a power branch line, a communication trunk line, and a communication branch line. The power trunk line is connected to a power source mounted on a vehicle and extends in a longitudinal direction of the vehicle. The power branch line branches off from the power trunk line and extends in a direction intersecting with the longitudinal direction. The communication trunk line is arranged along the power trunk line or also serves as the power trunk line. The communication branch line branches off from the communication trunk line and extends in a direction intersecting with the longitudinal direction. By combining the trunk lines extending in the longitudinal direction and the branch lines extending in the direction intersecting with the longitudinal direction, the wire harness according to the present embodiment can be arranged by a simpler wiring path.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   a power trunk line connected to a power source mounted on a vehicle and extending in a longitudinal direction of the vehicle;
   a power branch line branching off from the power trunk line and extending in a direction intersecting with the longitudinal direction;
   a communication trunk line arranged along the power trunk line or also serving as the power trunk line;

a communication branch line branching off from the communication trunk line and extending in a direction intersecting with the longitudinal direction; and a power terminal block that electrically connects the power trunk lines to each other and electrically connects the power trunk line and the power branch line, wherein the power trunk line and the communication trunk line are flat wiring materials and layered with each other, and the communication trunk line is arranged outermost in a layering direction.

2. The wire harness according to claim 1, wherein
the communication branch line is arranged along the power branch line.

3. The wire harness according to claim 1, wherein
the power trunk line connects the power source arranged in a rear part of the vehicle and a power generator arranged in a front part of the vehicle.

4. The wire harness according to claim 2, wherein
the power trunk line connects the power source arranged in a rear part of the vehicle and a power generator arranged in a front part of the vehicle.

5. The wire harness according to claim 1, wherein
the trunk line includes a plurality of power trunk lines belonging to a plurality of respective systems.

6. The wire harness according to claim 2, wherein
the trunk line includes a plurality of power trunk lines belonging to a plurality of respective systems.

7. The wire harness according to claim 3, wherein
the trunk line includes a plurality of power trunk lines belonging to a plurality of respective systems.

8. The wire harness according to claim 1, further comprising:
a ground line extending along the power trunk line.

9. The wire harness according to claim 2, further comprising:
a ground line extending along the power trunk line.

10. The wire harness according to claim 3, further comprising:
a ground line extending along the power trunk line.

11. The wire harness according to claim 5, further comprising:
a ground line extending along the power trunk line.

12. The wire harness according to claim 1, further comprising:
a communication controller arranged between the communication trunk line and the communication branch line to control communications, wherein
a power line of the communication controller is connected to the power trunk line or the power branch line.

13. The wire harness according to claim 2, further comprising:
a communication controller arranged between the communication trunk line and the communication branch line to control communications, wherein
a power line of the communication controller is connected to the power trunk line or the power branch line.

14. The wire harness according to claim 3, further comprising:
a communication controller arranged between the communication trunk line and the communication branch line to control communications, wherein
a power line of the communication controller is connected to the power trunk line or the power branch line.

15. The wire harness according to claim 5, further comprising:
a communication controller arranged between the communication trunk line and the communication branch line to control communications, wherein
a power line of the communication controller is connected to the power trunk line or the power branch line.

16. The wire harness according to claim 8, further comprising:
a communication controller arranged between the communication trunk line and the communication branch line to control communications, wherein
a power line of the communication controller is connected to the power trunk line or the power branch line.

17. The wire harness according to claim 1, wherein
the power trunk line and the communication trunk line are arranged in the longitudinal direction along a floor panel of the vehicle, and
the power branch line and the communication branch line branch off from the power trunk line and the communication trunk line, respectively, in a vehicle width direction and are arranged in the vehicle width direction along the floor panel.

18. The wire harness according to claim 2, wherein
the power trunk line and the communication trunk line are arranged in the longitudinal direction along a floor panel of the vehicle, and
the power branch line and the communication branch line branch off from the power trunk line and the communication trunk line, respectively, in a vehicle width direction and are arranged in the vehicle width direction along the floor panel.

19. The wire harness according to claim 3, wherein
the power trunk line and the communication trunk line are arranged in the longitudinal direction along a floor panel of the vehicle, and
the power branch line and the communication branch line branch off from the power trunk line and the communication trunk line, respectively, in a vehicle width direction and are arranged in the vehicle width direction along the floor panel.

20. The wire harness according to claim 5, wherein
the power trunk line and the communication trunk line are arranged in the longitudinal direction along a floor panel of the vehicle, and
the power branch line and the communication branch line branch off from the power trunk line and the communication trunk line, respectively, in a vehicle width direction and are arranged in the vehicle width direction along the floor panel.

* * * * *